(12) United States Patent
Iwane

(10) Patent No.: US 6,493,049 B2
(45) Date of Patent: Dec. 10, 2002

(54) PDLC DISPLAY DEVICE INCLUDING FIRST ELECTRODE PATTERN AND SECOND ELECTRODE PATTERN DISPOSED ADJOININGLY TO THE FIRST VIA A BOUNDARY AREA

(75) Inventor: Toru Iwane, Yokohama (JP)

(73) Assignee: Nikon Corporation, Tokyo (JP)

( * ) Notice: Subject to any disclaimer, the term of this patent is extended or adjusted under 35 U.S.C. 154(b) by 135 days.

(21) Appl. No.: 09/760,751

(22) Filed: Jan. 17, 2001

(65) Prior Publication Data

US 2001/0009448 A1 Jul. 26, 2001

(30) Foreign Application Priority Data

Jan. 19, 2000 (JP) ........................................ 2000-010963
Dec. 20, 2000 (JP) ........................................ 2000-387282

(51) Int. Cl.⁷ ...................... G02F 1/1333; G02F 1/1343
(52) U.S. Cl. .......................................... 349/86; 349/143
(58) Field of Search ........................... 349/86, 139, 143

(56) References Cited

U.S. PATENT DOCUMENTS 5,905,552 A * 5/1999 Yoshida et al. ............... 349/86
6,166,834 A * 12/2000 Taketomi et al. .............. 349/5
6,421,109 B1 * 7/2002 Popovich ..................... 348/756

* cited by examiner

Primary Examiner—William L. Sikes
Assistant Examiner—Tarifur R. Chowdhury
(74) Attorney, Agent, or Firm—Miles & Stockbridge P.C.

(57) ABSTRACT

A liquid-crystal display device comprising a polymer-dispersed liquid-crystal layer capable of coming into a light scattering state when no voltage is applied, and first and second transparent electrodes capable of forming an electric field to the polymer-dispersed liquid-crystal layer. The first transparent electrode has a first electrode pattern and a second electrode pattern disposed adjoiningly to the first electrode pattern via a boundary area between them. The boundary area has a width adequate to make transparent the polymer-dispersed liquid-crystal layer at its area corresponding to the boundary area, by the action of an electric field formed by the second electrode pattern and second transparent electrode. This liquid-crystal display device enables any desired display to be superimposed on the background image while preventing the difficulty that the wiring area extending to a display mark is displayed or only the edging of the display mark is displayed.

6 Claims, 27 Drawing Sheets

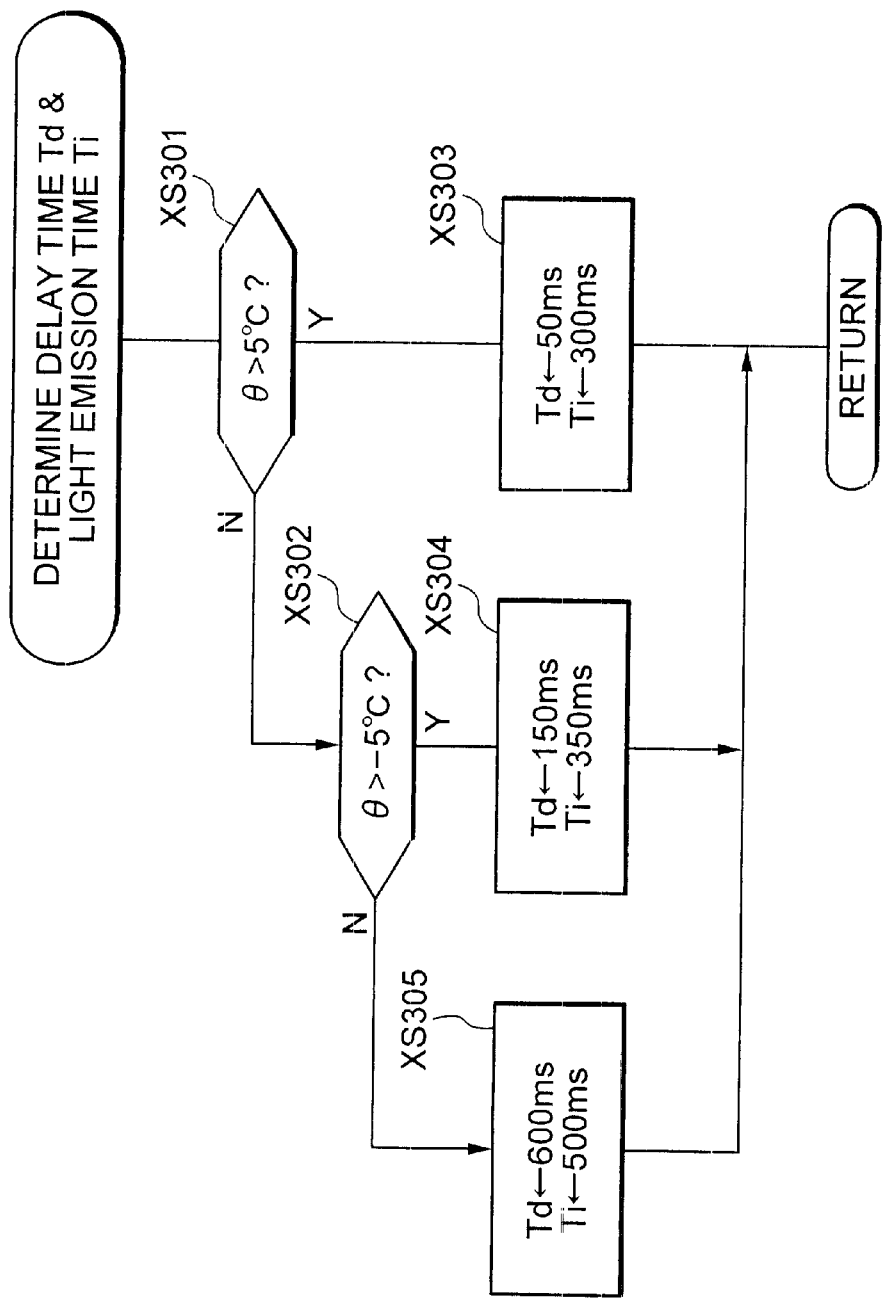

PDLC DISPLAY DEVICE INCLUDING FIRST ELECTRODE PATTERN AND SECOND ELECTRODE PATTERN DISPOSED ADJOININGLY TO THE FIRST VIA A BOUNDARY AREA

The disclosures of the Japanese Applications Nos. 2000-008572, 2000-010963, 2000-175774 and 2000-387282, are hereby incorporated by reference.

BACKGROUND OF THE INVENTION

1. Field of the Invention

The present invention relates to a liquid-crystal display device making use of a polymer-dispersed liquid crystal.

2. Related Background Art

In liquid-crystal display devices which make use of polymer-dispersed liquid crystal to perform efficient action, usually the display is made utilizing two states that the liquid crystal is brought into a non-transparent state (made to stand non-transparent: light scattering state) by non-electrification and is brought into a transparent state (made to stand transparent: light non-scattering state) by electrification. Stated specifically, in the liquid-crystal display devices of such a type, a polymer-dispersed liquid crystal is so disposed as to be held between opposing transparent electrodes. Upon application of in-phase alternating-current signals to both the transparent electrodes, the liquid crystal comes into a light scattering state where no voltage is applied, and, upon application of out-of-phase alternating-current signals to both the transparent electrodes, it comes into a transparent state where a voltage is applied. The driving of liquid crystal in this way brings patterns into the transparent state and their surroundings into the light scattering state, whereby transparent regions can be displayed on a white background similar to ground glass; or brings patterns into the light scattering state and their surroundings into the transparent state, whereby white regions can be displayed on a transparent background.

Where transparent regions are displayed on a white background, any particular problem does not arise even in apparatus constructed as described above. However, where it is attempted to display white regions on a transparent background, the following problems may arise.

Think about display regions set like islands in a transparent background. In such a case, even when the background region which surrounds display regions is kept into a transparent background by applying a voltage thereto, wiring areas extending to the display regions come into question. More specifically, where the island-like display regions stand non-electrified, i.e., the voltages applied to the both electrodes are in phase, the wiring areas extending to those regions have of course the same phase as the opposing transparent electrodes. This means that, when the island-like display regions are displayed in the light scattering state, the wiring areas extending there to the display regions also come into the light scattering state and are inevitably simultaneously displayed.

In liquid-crystal display devices, the fact that the island-like display regions are displayed in the background standing transparent means that, when a liquid-crystal display panel is incorporated in an optical system, display marks are so displayed as to come up to the surface as white regions in a state what is called "superimposed" to image formed by light beam transmitted through a transparent region. In such a case, to the display mark, wiring through which a voltage is supplied thereto is connected, and hence the voltage is applied to the liquid crystal via the wiring, so that all the segments that constitute the display mark look like as if strings are attached corresponding to the wiring areas extending from the margin of a picture, to spoil the light beam image transmitted through the transparent region.

In addition, at the boundary between a background area and a display mark, there is a boundary between the segments that constitute the transparent electrodes corresponding to the both, and this boundary remains inevitably as a blank area where no electrode pattern is present. In this blank area, no electric field comes up to the liquid-crystal region present oppositely to this blank area, and hence the light scattering state is always maintained. Namely, what is to be displayed when the background area is made transparent and the display mark is also made transparent is displayed as a white region as if the blank area is an edging of the display mark. When the display mark area is made white, a display mark is formed in which both the blank area and the display mark area are painted out as a white region.

Thus, in conventional liquid-crystal display devices, the display mark can not completely be made to disappear even when it is unnecessary, and there comes to be a disadvantage on display that the wiring area goes on and off concurrently every time the display mark goes on and off. Such a disadvantage provides a great obstacle when any desired display is optically superimposed on a background image. That is, the display to be superimposed is desired not only to be simply displayed, but also to disappear completely when it is unnecessary.

As for the polymer-dispersed liquid crystal, it responds more slowly as temperature is lower, and hence may cause a problem that the brightening of display segments does not agree with the timing of illumination as long as the illumination is merely performed.

For example, at a normal temperature of 25° C., the polymer-dispersed liquid crystal takes about 10 msec as a time taken to change from the light scattering state to the transparent state and about 60 msec as a time taken to change from the transparent state to the light scattering state, changing almost instantaneously. However, at a low temperature of −10° C., it takes about 300 msec as a time taken to change from the light scattering state to the transparent state and about 1,400 msec as a time taken to change from the transparent state to the light scattering state, showing a very slow response.

Hence, where one of a plurality of segments is selected by a selector, the liquid crystal responds so slowly at low temperature that the illumination may end before the selected segment changes into the light scattering state, and further that a segment having been selected before that is illuminated. Thus, there is a problem that any selected segment is not accurately illuminated. This problem has not been solved under existing circumstances.

SUMMARY OF THE INVENTION

Accordingly, an object of the present invention is to provide, as first invention of the present application, a liquid-crystal display device that enables any desired display to be superimposed on the background image while preventing the difficulty that the wiring area extending to a display mark is displayed or only the edging of the display mark is displayed.

To achieve the above object, the liquid-crystal display device of the first invention comprises a polymer-dispersed liquid-crystal layer capable of coming into a light scattering state when no voltage is applied, and first and second transparent electrodes capable of forming an electric field in the polymer-dispersed liquid-crystal layer;

the first transparent electrode having a first electrode pattern and a second electrode pattern disposed adjoiningly to the first electrode pattern via a boundary area between them;

the boundary area having a width adequate to make transparent the polymer-dispersed liquid-crystal layer at its area corresponding to the boundary area, by the action of an electric field formed by the second electrode pattern and second transparent electrode.

According to the first invention, when in the above device the first electrode pattern and the second electrode pattern come into the transparent state upon application of a voltage to the both, the surrounding electric field strays into the polymer-dispersed liquid-crystal layer lying in a region opposing to the boundary area of the both patterns, so that the boundary area of the both patterns is not displayed and not seen.

In the liquid-crystal display device of the first invention, preferably the first electrode pattern may be a display pattern, the second electrode pattern may be a background pattern, and boundary area may have a width substantially equal to the layer thickness of the polymer-dispersed liquid crystal layer.

In the liquid-crystal display device of the first invention, also preferably the first electrode pattern may be a wiring pattern, the second electrode pattern may be a background pattern, and the first electrode pattern and the boundary area may have a total width substantially equal to the layer thickness of the polymer-dispersed liquid crystal layer.

An object of a second invention of the present application is to provide, a liquid-crystal display illumination device that enables appropriate illumination of the selected segment even when there are changes in temperature.

The second invention provides a liquid-crystal display illumination device comprising;

a display panel having a plurality of display segments having sealed a polymer-dispersed liquid-crystal layer capable of switching a light scattering state where light is scattered and a transparent state light non-scattering state where light is transmitted;

a selection part which selects at least one display segment of the plurality of display segments of the display panel;

a drive circuit which brings into the light scattering state the display segment selected by the selection part and drives an unselected region in the transparent state;

an illumination part which illuminates the display panel;

a temperature detection part which detects the temperature of the polymer-dispersed liquid-crystal layer or its vicinity; and an illumination control part which controls delay time and/or light-emission time in accordance the temperature detected by the temperature detection part; the former being the time after the selection part has been operated and until the illumination part starts illumination, and the latter being the time after the illumination part has started illumination and until it ends the illumination.

In the liquid-crystal display illumination device of the second invention, preferably the delay time in the illumination control part may be set longer than the time for which the display segment of the display panel at the detected temperature switches from the light scattering state to the transparent state.

In the liquid-crystal display illumination device of the second invention, also preferably the delay time in the illumination control part may be set shorter than the time for which the display segment of the display panel at the detected temperature switches from the transparent state to the light scattering state.

In the liquid-crystal display illumination device of the second invention, still also preferably the light-emission time in the illumination control part may be set equal to or longer than the time for which the display segment of the display panel switches from the transparent state to the light scattering state.

In the liquid-crystal display illumination device of the second invention, still also preferably the device may further comprise;

a photometric part which measures the brightness of the display panel or its vicinity; and a light emission inhibition part which inhibits the illumination part from emitting light when the photometric value measured by the photometric part is higher than a preset luminance.

In the liquid-crystal display illumination device of the second invention, still also preferably the illumination part may comprise a light source which generates light and a light guide member which guides to the display panel the light emitted from the light source.

The polymer-dispersed liquid crystal may also be used in a view finder of a camera.

In the liquid-crystal display device making use of this polymer-dispersed liquid crystal, the liquid-crystal layer can be switched into two modes of light non-scattering state/ light scattering state by switching a voltage applied to the liquid-crystal layer, and any desired information can be displayed by making the shape of the electrode (transparent electrode) have any desired shape (construct the display panel).

Accordingly, the liquid-crystal display device thus constructed may be disposed in the vicinity of a screen in the view finder of a camera so that any optical image formed on the screen can be recognized through the liquid-crystal display device. In this state, the voltage applied to the liquid-crystal layer may be controlled, whereby any desired information can appropriately be displayed superimposingly on the optical image formed on the screen.

In such a case, the liquid-crystal display panel of the liquid-crystal display device may consist basically of two sheets of transparent substrates provided with a plurality of transparent electrodes and a polymer-dispersed liquid-crystal layer sealed between the two sheets of transparent substrates, and the transparent electrodes having the desired shapes and opposing each other, interposing this polymer-dispersed liquid-crystal layer may constitute the display segment. Then, the polymer-dispersed liquid-crystal layer held between the transparent electrodes to which a voltage has been applied does not scatter light (light non-scattering state) and only the polymer-dispersed liquid-crystal layer to which a voltage has not been applied scatters light (light scattering state).

Thus, the display segment can be displayed on the liquid-crystal display panel in any desired form by selectively applying the voltage to a plurality of transparent electrodes constituting a plurality of display segments disposed in the liquid-crystal display panel.

In view finder devices of electronic optical instruments such as single-lens reflex cameras, there is a demand that, when a plurality of display segments provided in a view finder are selected in order to show their use conditions and so forth, the selected display segments are desired to be displayed in a state contrasting distinctively with other display segments so that these are visually clearly recognizable by a photographer.

For example, in a single-lens reflex camera so constructed that one focus area is selected from a plurality of focus areas to perform focusing, the information on what focus area stands selected at the time of photo-taking is one of those which are desired to be clearly recognized by a photographer through a display segment corresponding to the selected focus area (hereinafter often "indication segment").

A third invention of the present application was also made taking account of such circumstances, and has its object to provide a liquid-crystal display device that enables the indication segment (a specific display segment selected by a photographer from among a plurality of display segments) to be clearly recognized in a state contrasting distinctively with other display segments.

The third invention provides a liquid-crystal display device comprising;

a liquid-crystal display panel having an indication segment comprising a plurality of indications capable of making selective display by selection operation, and a display segment comprising an indication other than the former indications;

a light source;

a light guide means for guiding to the liquid-crystal display panel the light emitted from the light source;

selection means for performing the selection operation;

control means for controlling the display segment and the indication segment selected by the selection operation, into a light scattering state or a light non-scattering state; and an action-detecting means for detecting the state of action of an electronic optical instrument in which the liquid-crystal display panel is incorporated;

the control means being capable of forcedly controlling into the light non-scattering state the display segment having come into the light scattering state, to make the light source emit light, at the time the action-detecting means has detected, as the state of action, a state of action which requires to make sure of the selected indication. This enables the indication segment to be clearly recognized in a state contrasting distinctively with other display segments, even in an instance in which any other segment stands provisionally selected when a specific segment is selected.

In the liquid-crystal display device of the third invention, the control means may preferably be so made up that it makes the light source emit light for a given period and, after lapse of the given period, makes return into the light scattering state the display segment forcedly changed into the light non-scattering state. This enables the indication segment to be clearly recognized by a photographer in a state contrasting distinctively for a given period, and thereafter enables another display segment to be recognized by the photographer.

The liquid-crystal display device of the third invention may also comprise photometric means for measuring the luminance of the liquid-crystal display panel or its vicinity, connected to the control means;

the control means being capable of inhibiting the light source from emitting light when the luminance measured by the photometric means is higher than a preset value. This enables the selected indication segment to be illuminated by the light from the light source to become visually recognizable with ease when the environment around the liquid-crystal display panel is dark, and enables the selected indication segment to be brought into the light scattering state to look dark to become visually recognizable with ease when the environment around the liquid-crystal display panel is bright.

In the liquid-crystal display device of the third invention, the electronic optical instrument may be an autofocus camera having a plurality of focus areas, where the state of action which requires to make sure of the selected indication is at least one of an autofocusing state and a focus-area-selected state. This makes it possible, in the state of autofocusing action, to make sure of the focus area standing selected by the indication segment, and makes it easy, in the focus-area-selected state, to select a new focus area while making sure of the focus area standing already selected.

BRIEF DESCRIPTION OF THE DRAWINGS

FIG. 16 is a flow chart showing the action of CPU (X8) (sub-routine for determining delay time and light-emission time) in the liquid-crystal display illumination device according to the embodiment of the second invention.

DESCRIPTION OF THE PREFERRED EMBODIMENTS

Figure 1:
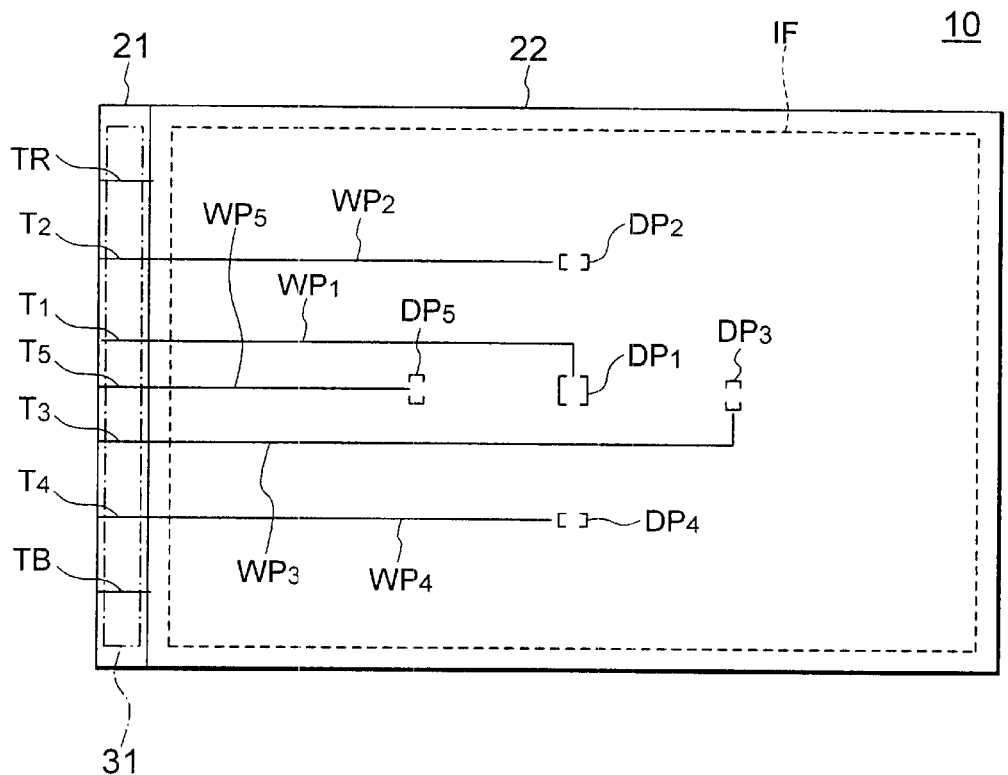
FIG. 1 is a plan view of a display panel constituting a liquid-crystal display device according to a first embodiment of the first invention of the present application.

FIG. 1 is a plan view of a display panel 10 constituting a liquid-crystal display device according to a first embodiment of the first invention of the present application. This display panel 10 comprises a polymer-dispersed liquid crystal detailed later which is held between two sheets of first and second glass plates 21 and 22 in the thickness direction. In the interior of a rectangular visual field region IF, five display patterns (square-bracketed portions in the drawing) DP1 to DP5 are appropriately arranged. The display patterns DP1 to DP5 and wiring patterns WP1 to WP5 connected at one ends thereof to these display patterns DP1 to DP5, respectively, are formed on the inner-surface side of the top-side second glass plate 22. The other ends of the respective wiring patterns WP1 to WP5 extend toward one side of the display panel 10. At this side, the back-side first glass plate 21 is protruded to form a terrace. On the surface of the first glass plate 21 side at this terrace, a terminal lead-out part 31 is formed.

At the terminal lead-out part 31, terminals T1 to T5 are formed at given pitches. The terminals T1 to T5 are connected to the wiring patterns WP1 to WP5, respectively. To this terminal lead-out part 31, a rubbery member called a zebra, comprising an insulating layer and a conductive layer which are thinly stacked in multi-layer, or a flexible cable is contact-bonded. Thus, wires for supplying electricity from a drive circuit (described later) provided on the outside can appropriately be connected to the wiring patterns WP1 to WP5 through the terminals T1 to T5, respectively.

On the inner surface of the second glass plate 22, a background pattern (not shown) is formed around the display patterns DP1 to DP5 and wiring patterns WP1 to WP5, leaving a small gap. Also, on the inner-side surface of the first glass plate 21 opposing the second glass plate 22, a back electrode 32 (shown in FIG. 2) is formed over the whole surface. A terminal TB provided on the terminal lead-out part 31 is connected to the former background pattern, and a terminal TR provided on the terminal lead-out part 31 is connected to the latter back electrode 32.

Figure 2:
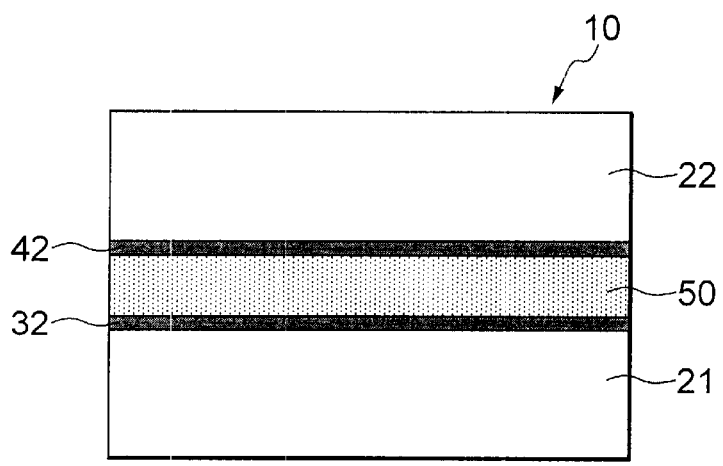
FIG. 2 is a view showing a cross-sectional structure of the display panel shown in FIG. 1.

FIG. 2 shows a cross-sectional structure of the display panel shown in FIG. 1. As can be seen from FIG. 2, this display panel 10 has a structure wherein a polymer-dispersed liquid crystal 50 has been poured into a space between the first glass plate 21 and the second glass plate 22. Between the polymer-dispersed liquid crystal 50 and the first glass plate 21 and between the polymer-dispersed liquid crystal 50 and the second glass plate 22, very thin transparent electrode layers 32 and 42 are formed, respectively, which are each comprised of ITO (indium-tin oxide).

The upper-side transparent electrode layer 42 corresponds to any of the display patterns DP1 to DP5, the wiring patterns WP1 to WP5 and the background pattern provided around these, shown in FIG. 1. More specifically, the transparent electrode layer 42 is constituted of the display patterns DP1 to DP5, the wiring patterns WP1 to WP5 and the background pattern. As for the lower-side transparent electrode layer 32, it corresponds to a common back electrode provided opposingly to the above all patterns in a uniform fashion.

The polymer-dispersed liquid crystal 50 is comprised of a polymer/liquid-crystal composite material in which a nematic liquid crystal has been dispersed in a polymer, and is a material in which the refractive index of liquid crystal is changeable by an electric field effect to cause a change in the degree of light scattering. Here, when substantially a zero voltage is applied to the transparent electrode layers 32 and 42 provided in pair, the polymer-dispersed liquid crystal 50 comes into a light scattering state where no electric field is given, to become cloudy. On the other hand, when a voltage of a given level or higher is applied to the transparent electrode layers 32 and 42 provided in pair, the polymer-dispersed liquid crystal 50 comes into a state where a voltage is applied, to become transparent, showing high light transmission properties.

The polymer-dispersed liquid crystal 50 may have a thickness of about 10 μm or smaller, and the transparent electrode layers 32 and 42, tens of nanometers (nm), which are very small compared with the glass plates 21 and 22 of as large as hundreds of micrometers (μm).

Figure 3A:
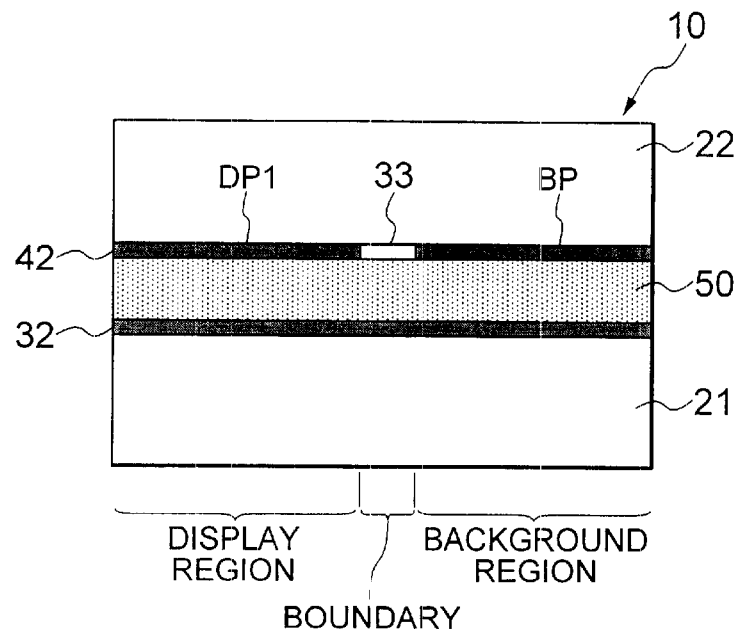
FIGS. 3A and 3B each illustrates a state of display at the boundary or boundaries of a transparent electrode.
Figure 3B:
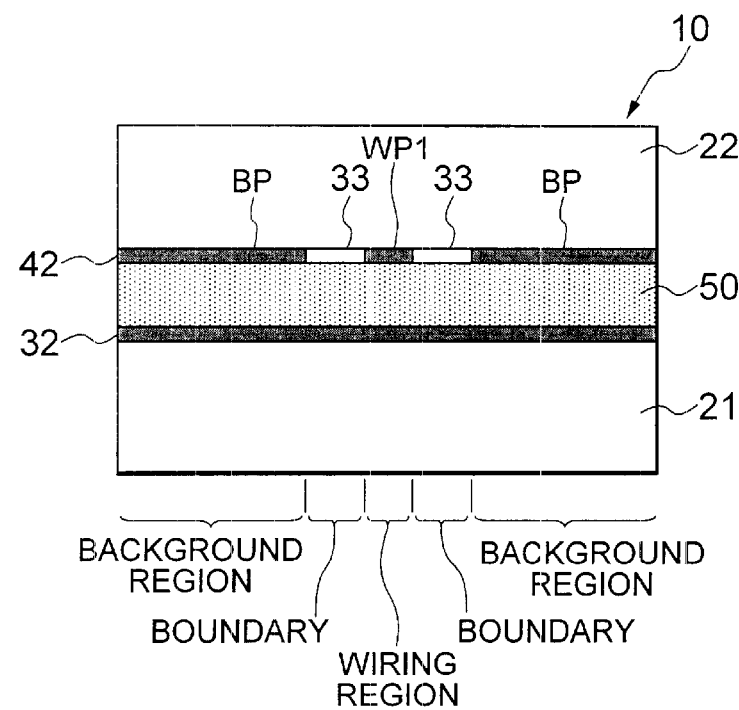

FIGS. 3A and 3B each illustrate a state of display at the boundary or boundaries of a transparent electrode. FIG. 3A shows the boundary between a display pattern and the background pattern, and FIG. 3B shows the boundaries between a wiring pattern and the background pattern.

In the case of FIG. 3A, the transparent electrode layer 42 on the side of the second glass plate 22 consists of a display pattern DPI and a background pattern BP. At the gap between the both patterns DP1 and BP, an insulating material layer 33 is provided which has thickness and refractive index equal to these patterns and is transparent. In the display region provided with the display pattern DP1, the polymer-dispersed liquid crystal 50 turns transparent upon application of a voltage to the display pattern DP1, to come into a non-display state. Also, in the background region provided with the background pattern BP, the polymer-dispersed liquid crystal 50 turns transparent upon application of a voltage to the background pattern BP, to transmit incident light beams (image light). When a voltage is applied to the both patterns DP1 and BP, it is considered that, at the boundary region provided with the insulating material layer 33, an electric field strays into the polymer-dispersed liquid crystal 50 from the surrounding area. As the result, the polymer-dispersed liquid crystal 50 turns transparent also at the boundary region, so that the whole visual field region of the display panel 10 transmits the incident light beams. Namely, when the display pattern DP1 turns transparent to come into the non-display state, any difficulty does not occur such that the boundary region between the display pattern DP1 and the background pattern BP, i.e., the contours of the display pattern DP1 are displayed. The boundary region thus provided with the insulating material layer 33 is in a width of such an extent that the electric field strays from the surrounding area into the polymer-dispersed liquid crystal 50 opposing this boundary region to make the boundary region transparent when a voltage is applied to the display pattern DP1 and background pattern BP. Stated specifically, the width of the boundary region between the both patterns is substantially equal to the thickness of the polymer-dispersed liquid crystal 50. Here, what is meant by "substantially equal" is that the width is not larger than about twice the layer thickness of the polymer-dispersed liquid crystal 50. In an actual liquid-crystal display device, the polymer-dispersed liquid crystal 50 has a thickness of about 10 $\mu$m, and hence the distance between the both patterns must be not larger than 20 $\mu$m at maximum.

On the other hand, when no voltage is applied to the display pattern DP1, i.e., when the power supply to the display pattern DP1 is cut off to bring it into a high-impedance state, the polymer-dispersed liquid crystal 50 turns cloudy in the display region to come into the light scattering state and is displayed as a white region. Here, the electric field strays from the background pattern BP into not only the boundary region but also the edge of the display region, but how the display is seen is little affected.

In the case of FIG. 3B, the transparent electrode layer 42 on the side of the second glass plate 22 consists of a wiring pattern WP1 and background patterns BP. At the gaps between the both patterns WP1 and BP, insulating material layers 33 are provided which have thickness and refractive index equal to these patterns and are transparent. In the background region provided with the background patterns BP, as already known the polymer-dispersed liquid crystal 50 turns transparent upon application of a voltage to the background patterns BP to transmit incident light beam. Also, in the wiring region provided with the wiring pattern WP1, the polymer-dispersed liquid crystal 50 turns transparent upon application of a voltage to the wiring pattern WP1, to transmit incident light beam. When a voltage is applied to the both patterns WP1 and BP, at each boundary region provided with the insulating material layer 33, an electric field strays into the polymer-dispersed liquid crystal 50 from the surrounding area, and the polymer-dispersed liquid crystal 50 turns transparent also at the boundary region, so that the whole visual field region of the display panel 10 transmits the incident light beam. Namely, when the wiring pattern WP1 turns transparent together with the display pattern DP1 to come into the non-display state, any difficulty does not occur such that the boundary region between the wiring pattern WP1 and the background pattern BP, i.e., the contours of the wiring pattern WP1 are displayed.

On the other hand, when no voltage is applied to the wiring pattern WP1, i.e., when the power supply to the display pattern DP1 is cut off to bring it into a high-impedance state, at the wiring region (e.g., of 5 $\mu$m wide) and the boundary regions (each region of, e.g., 7 $\mu$m wide) sandwiching the former region, the electric field strays from the surrounding background region into the polymer-dispersed liquid crystal 50 opposing these regions to make them transparent. Namely, when the display pattern DP1 is brought into the displayed state, the display of the wiring region can be made to disappear. Thus, in the present embodiment, the wiring pattern WP1 and the both-side boundary regions 33 and 33 sandwiching the wiring pattern WP1 are in a total width adequate for the polymer-dispersed liquid crystal 50 opposing this total-width portion, to be made transparent by the electric field straying thereinto from the surrounding background pattern BP. This total width is set substantially equal to the thickness of the polymer-dispersed liquid crystal 50. Here, what is meant by "substantially equal" is that the total width is not larger than about twice the layer thickness of the polymer-dispersed liquid crystal 50.

Incidentally, in the foregoing, the display pattern DP1, the background pattern BP and the wiring pattern WP1 are formed by vacuum deposition of ITO on the second glass plate 22, followed by etching of unnecessary portions. The gaps formed by the etching is filled with the insulating material layer 33 by a suitable method.

Figure 4:
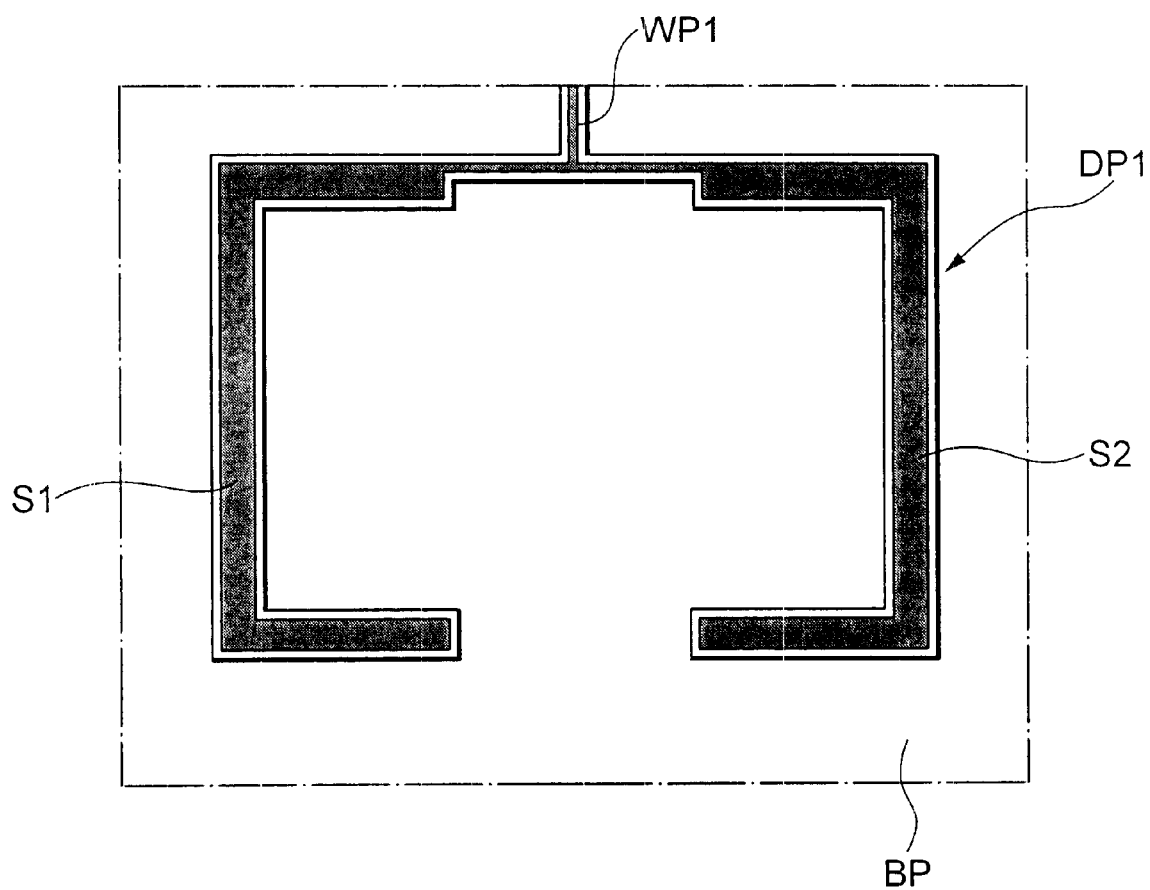
FIG. 4 is an enlarged plan view illustrating the shape of a display pattern.

FIG. 4 is an enlarged plan view illustrating the shape of a display pattern. The display pattern DP1 shown in the drawing is constituted of a pair of segments S1 and S2. The both segments S1 and S2 are connected to an end of the wiring pattern WP1 at which end they are branched. Incidentally, the segments S1 and S2, which are illustrated by deformation in the drawing, actually each have a width of about 100 $\mu$m, which is very large compared with the wiring pattern WP1 of about 5 $\mu$m wide.

Figure 5:
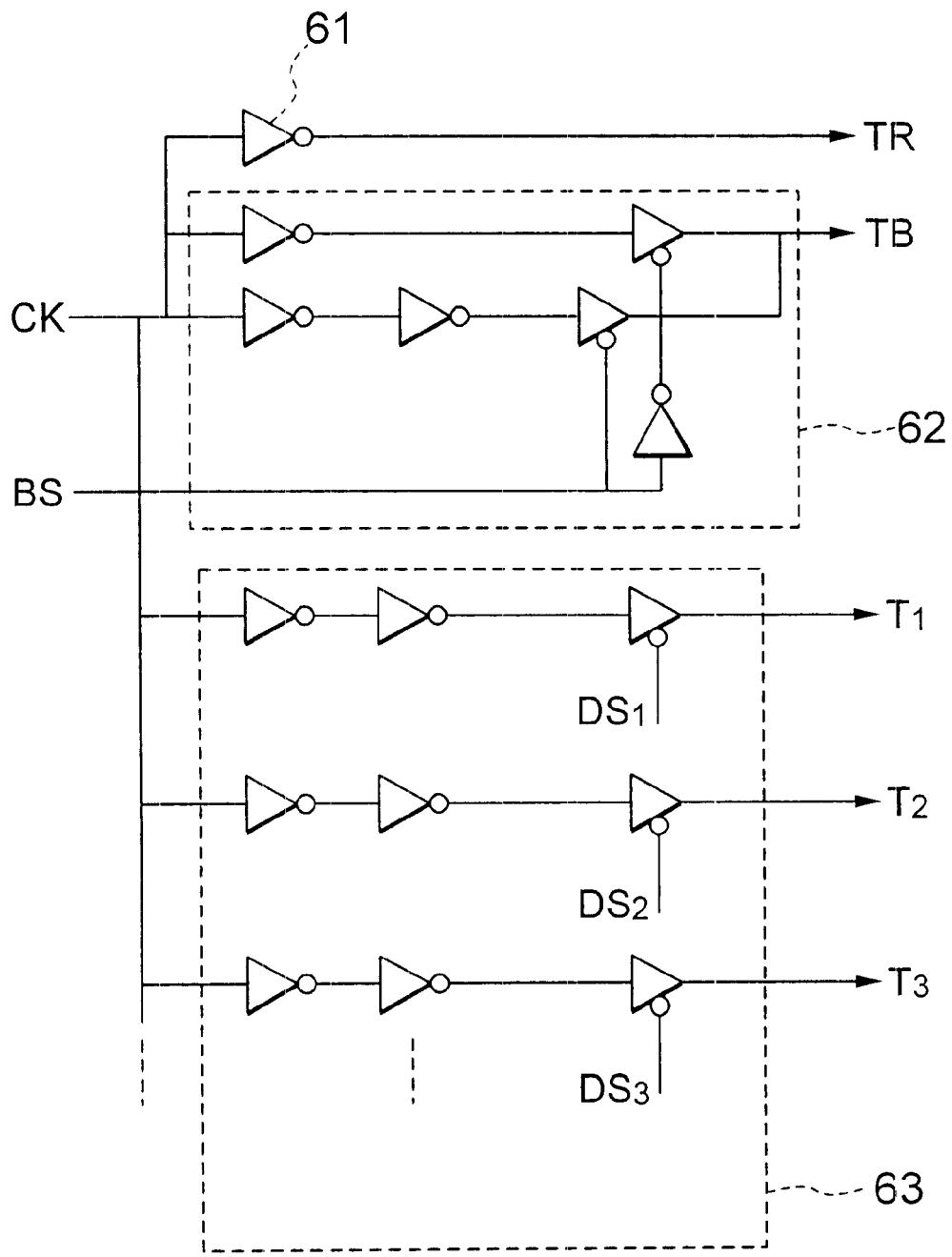
FIG. 5 illustrates a drive circuit of the display panel shown in FIG. 1.

FIG. 5 illustrates the main part of a drive circuit which controls the state of display of each pattern provided in the display panel shown in FIG. 1. This drive circuit consists basically of digital circuits elements such as inverters and three-state buffers, and has a back drive section 61 for driving the back-side transparent electrode layer 32 (see FIG. 3), a background drive section 62 for driving the background pattern BP (see FIG. 3), and a display drive section 63 for driving the display patterns DP1 to DP5 (see FIGS. 1 and 3).

As a clock signal CK serving as a reference, a rectangular wave of, e.g., 50 Hz, having a relatively low frequency, is used. To the transparent electrode layer 32 disposed on the back side of the polymer-dispersed liquid crystal 50, a reverse-phase signal formed by reversing the clock signal CK is applied through a terminal TR connected to an output of the back drive section 61. To the background pattern BP disposed on the top-surface side of the polymer-dispersed liquid crystal 50, any of a signal having the same phase (being in phase) with the terminal TR connected to the output of the back drive section 61 and a signal having a phase reverse thereto, i.e., a phase deviated by $\pi$ is applied through a terminal TB connected to an output of the back drive section 61. The switching of these in-phase signal and reverse-phase signal is so designed as to be arbitrarily performable by means of a signal applied to a control input terminal BS of the three-state buffers constituting the background drive section 62. To the display patterns DP1 to DP5 disposed on the top-surface side of the polymer-dispersed liquid crystal 50, a voltage is applied, or the application of voltage is cut off, through terminals T1, T2, T3 and so on connected to the output of the display drive section 63. Thus, the display patterns DP1 to DP5 can be switched between a state where the signal having a phase reverse to the terminal TR connected to the output of the back drive section 61 is applied and a high-impedance state where the connection of signal lines is cut off to make float electrically the lines of terminals T1, T2, T3 and so on. The switching between these reverse-phase signal applied state and high-impedance state is so designed as to be individually performable for each of the display patterns DP1 to DP5 by means of signals applied to control input terminals DS1, DS2, DS3 and so on of the three-state buffers constituting the background drive section 62.

First, take note of the output of the background drive section 62. The signal having a phase reverse to the terminal TR on the back side is applied to the background pattern BP through the terminal TB, whereupon an alternating-current electric field is generated across the background pattern BP and the transparent electrode layer 32, so that molecules of the liquid crystal constituting the polymer-dispersed liquid crystal 50 are oriented and this area (background region) turns transparent. Thus, the background region that occupies the greater part of the display region of the display panel 10 is made transparent, so that the incident light beam going through there from one side of the display panel to the opposite side thereof can pass through this region.

Next, take note of the output of the background drive section 63. The signal having a phase reverse to the terminal TR on the back side is applied to any of the display patterns DP1 to DP5 through the terminals T1, T2, T3 and so on, whereupon, like the above background region, the area (display region) corresponding to any of the display patterns DP1 to DP5 turns transparent.

Here, when the application of voltage to the output terminal of the display drive section 63 is cut off, the terminals T1, T2, T3 and so on come into the high-impedance state consequently.

Where pattern electrodes consisting of the display patterns DP1 to DP5 and wiring patterns WP1 to WP5 each has small line width, e.g., a width of 5 $\mu$m or smaller, the total width of each line width and the width of its both-side boundary regions comes to be substantially equal to the layer thickness of the polymer-dispersed liquid crystal 50 because the polymer-dispersed liquid crystal 50 has a layer thickness of about 10 $\mu$m as stated previously. Hence, the electric field of the background pattern electrode around the pattern electrode strays into the polymer-dispersed liquid crystal 50 lying immediately beneath the total-width region formed by the above pattern electrode having a small line width and its both-side boundary regions. Then, the polymer-dispersed liquid crystal 50 at this total-width region is made to bring out the effect of the electric field, and the liquid crystal at this area is oriented to make that region transparent in virtue of the properties inherent in the polymer-dispersed liquid crystal 50. More specifically, when the pattern electrodes having come into the high-impedance state have a small line width, these patterns and their adjoining boundary regions turn transparent, specifically at the areas of wiring patterns WP1 to WP5.

Where on the other hand the above pattern electrodes each has large line width, e.g., a width of hundreds of micrometers ($\mu$m) or larger, each pattern electrode is induced by the signal of the opposing transparent electrode layer 32 rather than by its adjoining electrode to strongly tend to have the same phase as this transparent electrode layer 32 and at the same time is less affected by the straying of electric field. Hence, the polymer-dispersed liquid crystal 50 lying immediately beneath the pattern electrode does not bring out any effect of the electric field, so that the polymer-dispersed liquid crystal 50 comes into the light scattering state. More specifically, when the pattern electrodes having come into the high-impedance state have a large line width, these are displayed as white regions in contrast to the transparent background regions, specifically at the areas of display patterns DP1 to DP5.

Figure 6:
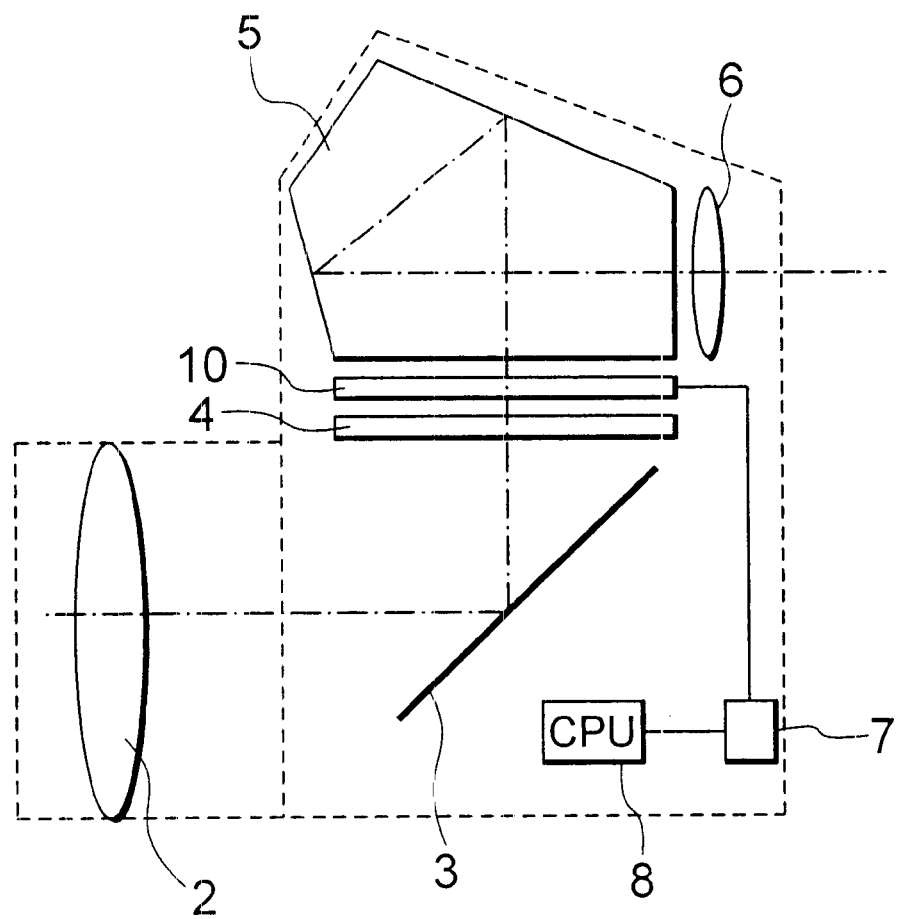
FIG. 6 illustrates the structure of a camera incorporated with the display panel shown in FIG. 1 and the drive circuit shown in FIG. 5.

FIG. 6 diagrammatically illustrates the structure of a single-lens reflex camera incorporated with the display panel shown in FIG. 1.

This single-lens reflex camera has a photo-taking lens 2 for forming an image of a camera subject on a film, a spring-up type reflecting mirror 3 for changing the optical path of light coming from the photo-taking lens 2, a screen 4 disposed on the plane that is conjugate to the film, a display panel 10 disposed in proximity to this screen 4, a penta-prism 5 through which the light transmitted through the screen 4 and display panel 10 is bent for the purpose of viewing, a lens 6 for viewing an image projected on the screen 4, and a drive circuit 7 which drives the display panel 10.

The display panel 10 has the structure as shown in FIGS. 1 to 4, and is driven by the drive circuit 7 having the structure as shown in FIG. 5. The drive circuit 7 acts in accordance with instructions from a CPU 8 which overall controls the action of the single-lens reflex camera. The CPU 8 controls the state of display of the display panel 10 via the drive circuit 7 in accordance with signals from an AE unit or AF unit (not shown).

Where as shown in FIG. 6 the display panel 10 is disposed in proximity to the screen 4, the image formed on the screen 4 by the photo-taking lens 2 passes through the background (background region) of the display panel 10 as it is. Also, when areas other than the background of the display panel 10, i.e., areas of the display patterns DP1 to DP5 come into the high-impedance state to come into the light scattering state, the light incident on these areas is scattered in every direction, and hence only very small part of the light goes toward an eye. The quantity of light at this area lowers necessarily, and the area displayed looks sunken darkly compared with other area. Such an effect brings the background and display patterns to be optically superimposed in the display panel 10. When no sufficient light reaches the screen 4, illumination light may be made incident in a suitable quantity of light from one edge face of the display panel 10, whereby bright display patterns can be superimposed on a dark background.

As is clear from the foregoing, in the display panel 10 according to the present embodiment, the width of each wiring pattern and the both gaps (boundary regions) between adjoining segments constituting the pattern are made small only enough for making them transparent by the aid of the straying of the electric field of the background region into the liquid crystal. At the same time, with regard to the segments constituting the display patterns DP1 to DP5, they are so designed as to have a large line width beyond the extent where the light scattering state is maintained even when the electric field of the background region strays into the liquid crystal. Hence, when the display patterns DP1 to DP5 are brought into the high-impedance state, the wiring patterns WP1 to WP5 turn transparent to come not to be seen and only the segments constituting the display patterns DP1 to DP5 are displayed as white regions. Also, the gap between each of the display patterns DP1 to DP5 and the background pattern BP is set sufficiently small, and hence, also when signals having a phase reverse to the back-side transparent electrode layer 32 are applied to the display patterns DP1 to DP5 to make them transparent, the same effect as in the above brings the electric field to stray in the region of the polymer-dispersed liquid crystal 50 opposing this gap region where no electrode is provided, so that the polymer-dispersed liquid crystal 50 turn transparent and the contours of the display patterns DP1 to DP5 come not to be seen.

Figure 7:
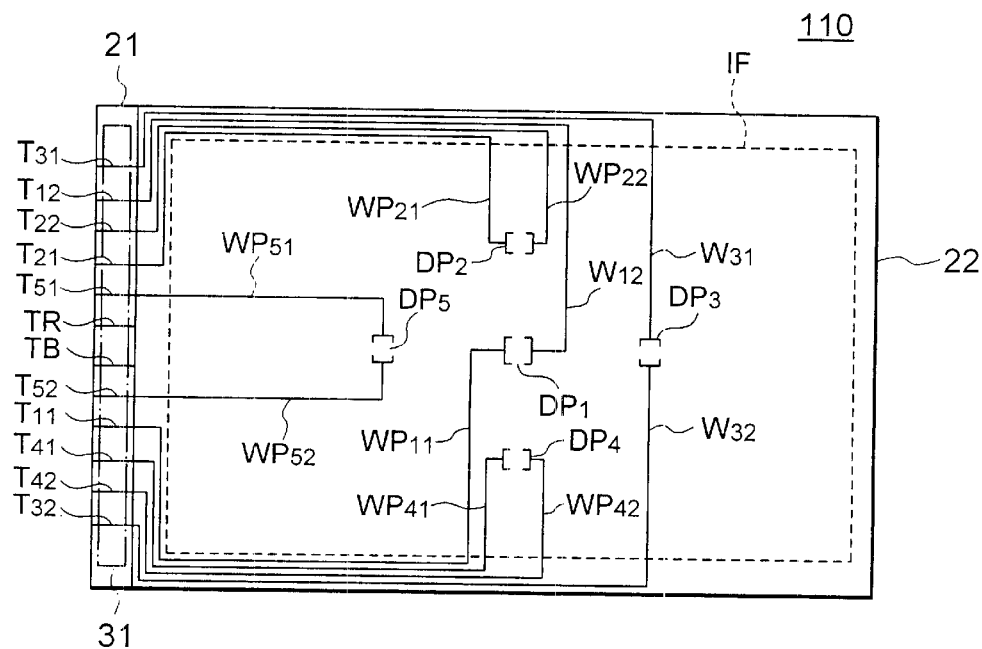
FIG. 7 is a plan view of a display panel constituting a liquid-crystal display device according to a second embodiment of the first invention.

FIG. 7 is a plan view of a display panel 110 constituting a liquid-crystal display device according to a second embodiment of the first invention. The liquid-crystal display device according to this second embodiment is a modification of the liquid-crystal display device according to the first embodiment, and like constituents are denoted by like reference numerals to avoid repetition of description.

In the interior of a visual field region IF of this display panel 110, five display patterns DP1 to DP5 are arranged like those shown in FIG. 1. The display patterns DP1 to DP5 each consists of a segment shaped in a right-open square bracket and a segment shaped in a left-open square bracket. To these segments, wiring patterns WP11 to WP51 are individually connected. Namely, the wiring pattern WP1 shown in FIG. 1 corresponds to WP11 and WP12 in FIG. 7, the wiring pattern WP2 corresponds to WP21 and WP22, the wiring pattern WP3 corresponds to WP31 and WP32, the wiring pattern WP4 corresponds to WP41 and WP42, and the wiring pattern WP5 corresponds to WP51 and WP52.

Then, terminals T11 to T52, TB and TR are formed at a terminal lead-out part 31. Here, the terminal T1 shown in FIG. 1 corresponds to terminals T11 and T12 in FIG. 7, the terminal T2 corresponds to terminals T21 and T22, the terminal T3 corresponds to terminals T31 and T32, the terminal T4 corresponds to terminals T41 and T42, and the terminal T5 corresponds to terminals T51 and T52.

In this embodiment, the wiring through which the electricity is supplied to the respective display patterns DP1 to DP5 is set in a larger number, but the display patterns DP1 to DP5 can be driven using substantially the same circuit as the drive circuit shown in FIG. 5.

Figure 8:
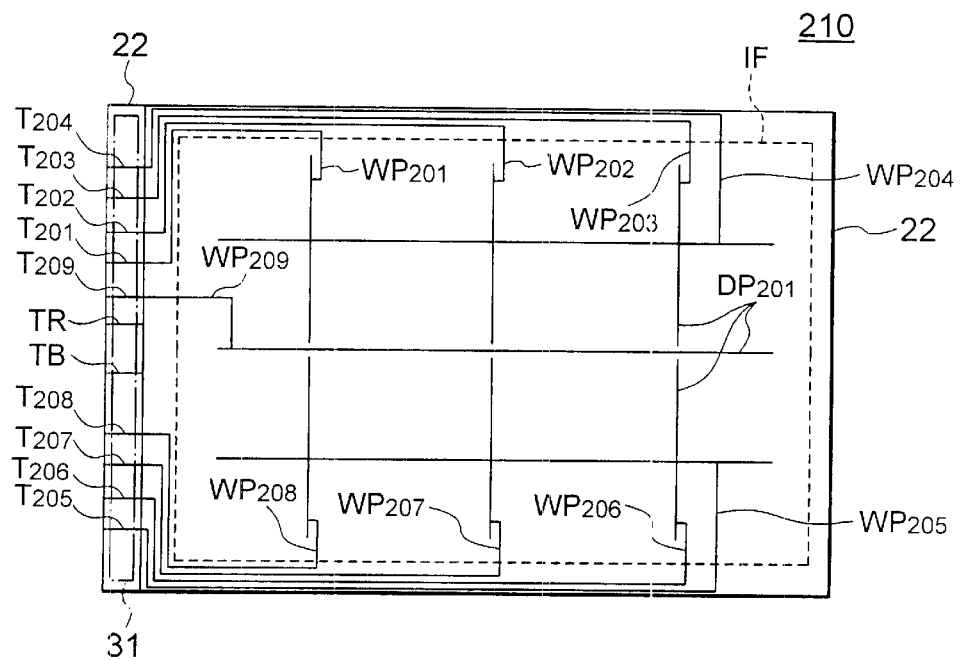
FIG. 8 is a plan view of a display panel constituting a liquid-crystal display device according to a third embodiment of the first invention.

FIG. 8 is a plan view of a display panel 210 constituting a liquid-crystal display device according to a third embodiment of the first invention. The liquid-crystal display device according to this third embodiment is a modification of the liquid-crystal display device according to the first embodiment.

In the interior of a visual field region IF of this display panel 210, a lattice-shaped display pattern DP201 is formed. To this display pattern DP201, a plurality of wiring patterns WP201 to WP209 are connected from its surrounding area. Then, terminals T201 to T209, TB and TR are formed at a terminal lead-out part 31.

In this embodiment, display pattern DP201 has a relatively large area. However, since a voltage is applied from a plurality of wiring patterns WP201, the desired display can be achieved without causing any difficulties such as phase delay.

The present invention has been described above according to the first to third embodiments. The present invention is by no means limited to the above embodiments. For example, the shape and size of the display pattern(s) may appropriately be modified in accordance with purposes for which the display panel is used.

In the foregoing embodiments, the display patterns DP1 to DP5 are driven in a digital fashion by utilizing three-state buffers to come into the high-impedance state. However, the display or non-display of the display patterns DP1 to DP5 may also be controlled in an analog fashion. In such a case, a sinusoidal wave having a phase reverse to the back-side transparent electrode layer 32 may be connected to the display patterns DP1 to DP5 or the voltage feed line to the display patterns DP1 to DP5 may be cut off, by means of an analog switch constituted of FETs (field-effect transistors). Alternatively, in place of the three-state buffers or FETs, the circuit may be connected or cut off using relays mechanically.

As is clear from the foregoing description, according to the liquid-crystal display device of the first invention, both the first electrode pattern and the second electrode pattern come into the transparent state upon application of voltage to the both patterns, where the electric field strays from the surrounding area into the polymer-dispersed liquid-crystal layer opposing the boundary region between the both patterns, so that the boundary region of the both adjoining patterns come not to be displayed and seen. Namely, in cameras and any other optical devices, what should be displayed as intended can optically be superimposed.

Figure 9:
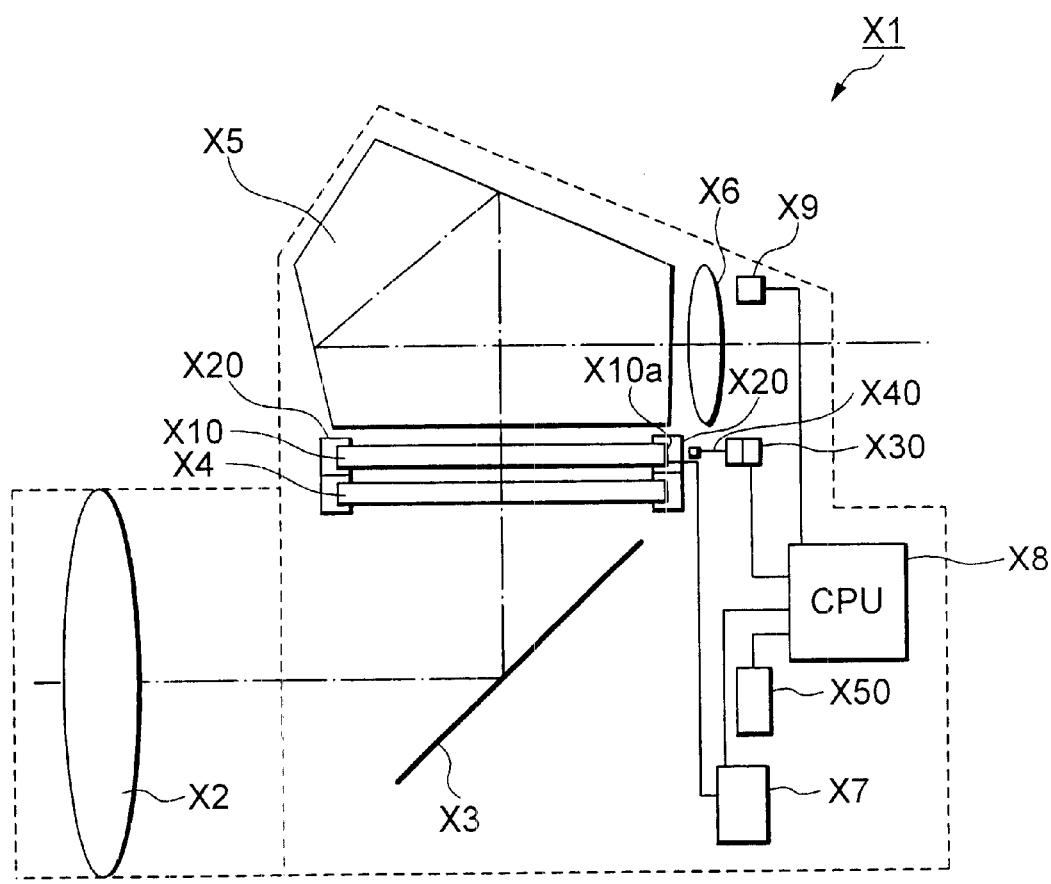
FIG. 9 diagrammatically illustrate the structure of a single-lens reflex camera incorporated with a liquid-crystal display illumination device according to an embodiment of the second invention of the present application.
Figure 10:
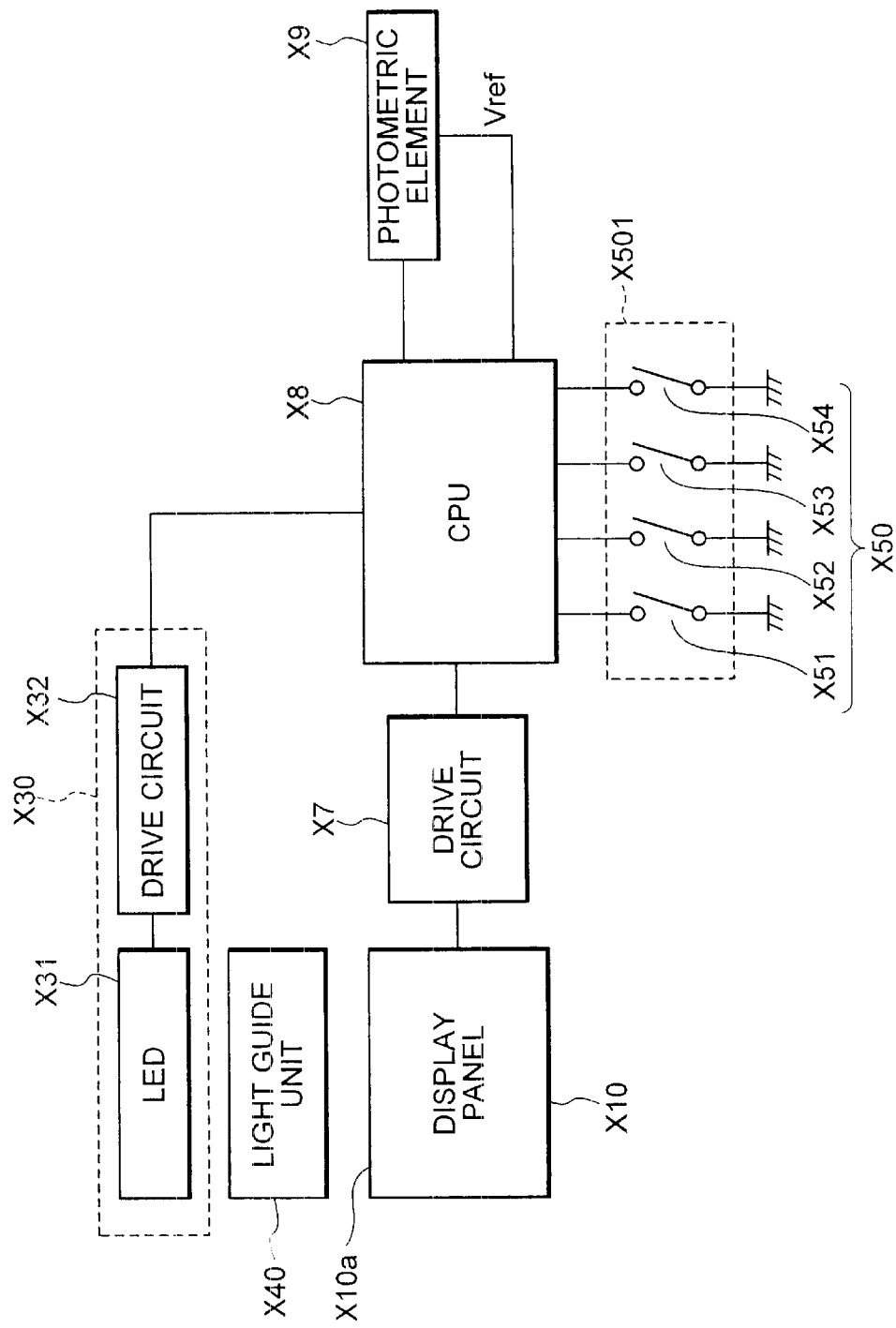
FIG. 10 is a block diagram showing a control system of the liquid-crystal display illumination device according to the embodiment of the second invention.

FIG. 9 diagrammatically illustrates the structure of a single-lens reflex camera X1 incorporated with a liquid-crystal display illumination device according to an embodiment of the second invention. FIG. 10 is a block diagram showing a control system of the liquid-crystal display illumination device according to the present embodiment.

This camera X1 has, as shown in FIG. 9, a photo-taking lens X2 for forming an image of a camera subject to be phototaken on a film, a spring-up type reflecting mirror X3 for changing the optical path of light coming from the photo-taking lens X2, a screen X4 disposed on the plane that is conjugate to the film, a polymer-dispersed liquid-crystal display panel X10 disposed in proximity to this screen X4, a penta-prism X5 through which the light transmitted through the screen X4 and display panel X10 is bent for the purpose of viewing, and an eyepiece X6 for viewing an image projected on the screen X4. Here, the display panel X10 is held with holders X20 and fixed to the camera.

As a display device, this camera X1 also has, in addition to the display panel X10, a light source X30 comprised of an LED or the like, a light guide unit X40 for guiding to an edge face X10a of the display panel X10 the light emitted from the light source X30, a drive circuit X7 which drives the display panel X10, a CPU X8, a photometric element X9, and a selector X50 for selecting segments of the display panel X10.

The light source X30 is, as shown in FIG. 10, constituted of an LED X31 and a drive circuit X32 for driving this LED X31. Light from the LED X31 of the light source X30 is guided to the edge face X10a of the liquid-crystal display panel X10 by means of the light guide unit X40.

The CPU X8 is a central processing unit which overall controls the action of the single-lens reflex camera in accordance with signals from an AE unit or AF unit (not shown). In this embodiment, it further controls the state of display of the display panel X10 via the drive circuit X7, in accordance with signals from the selector X50.

The photometric element X9 is constituted of an IC. It is a photoelectric transducer which detects the luminance of a camera subject to be phototaken and at the same time an element which outputs a voltage proportional to the absolute temperature.

Namely, this photometric element X9 measures the light transmitted through the photo-taking lens X2, turned by the reflecting mirror X3 and scattered through the screen X4 disposed on the plane that is conjugate to the film, and outputs the resultant luminance signals to the CPU X8. Incidentally, in this embodiment, it follows that the photometric element X9 also measures the brightness of the display panel X10 or its vicinity.

The photometric element X9 also detects absolute temperature proportional temperature, and outputs to the CPU X8 a voltage proportional to the absolute temperature. Representing the absolute temperature proportional voltage as $V_{ref}$ and keeping this voltage at 25° C. stored in the camera as a reference voltage $V_0$, a preset temperature θ (° C.) can be calculated according to the following equation (1) on the basis of a value obtained by detecting the absolute temperature proportional voltage $V_{ref}$.

$$θ=(V_{ref}/V_0)×298-273 \qquad (1)$$

More specifically, the detection of voltage $V_{ref}$ enables calculation of the temperature θ (° C.).

Figure 11:
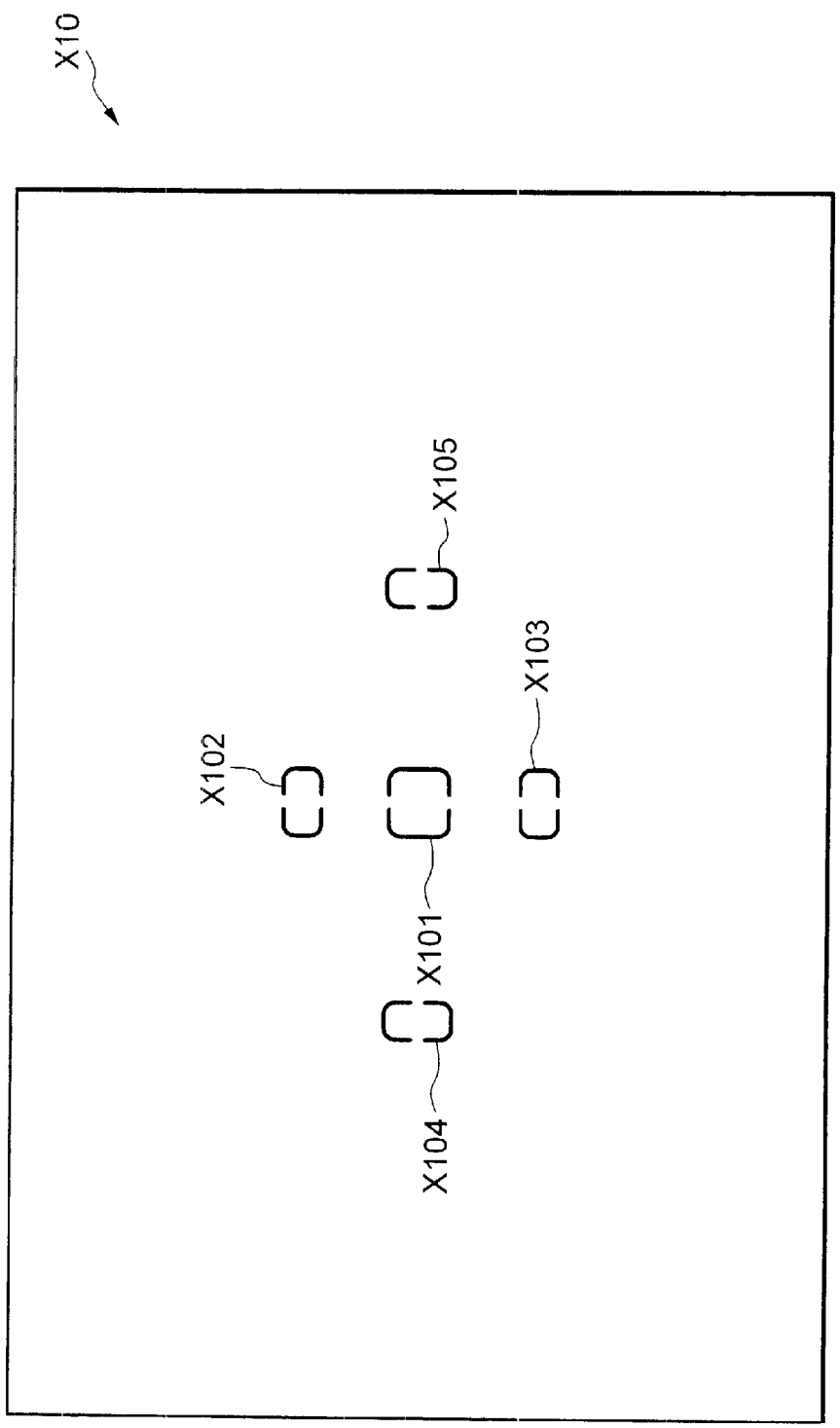
FIG. 11 illustrates a display panel X10 of the liquid-crystal display illumination device according to the embodiment of the second invention.

FIG. 11 illustrates a display panel X10 of the liquid-crystal display illumination device according to the present embodiment.

Figure 12:
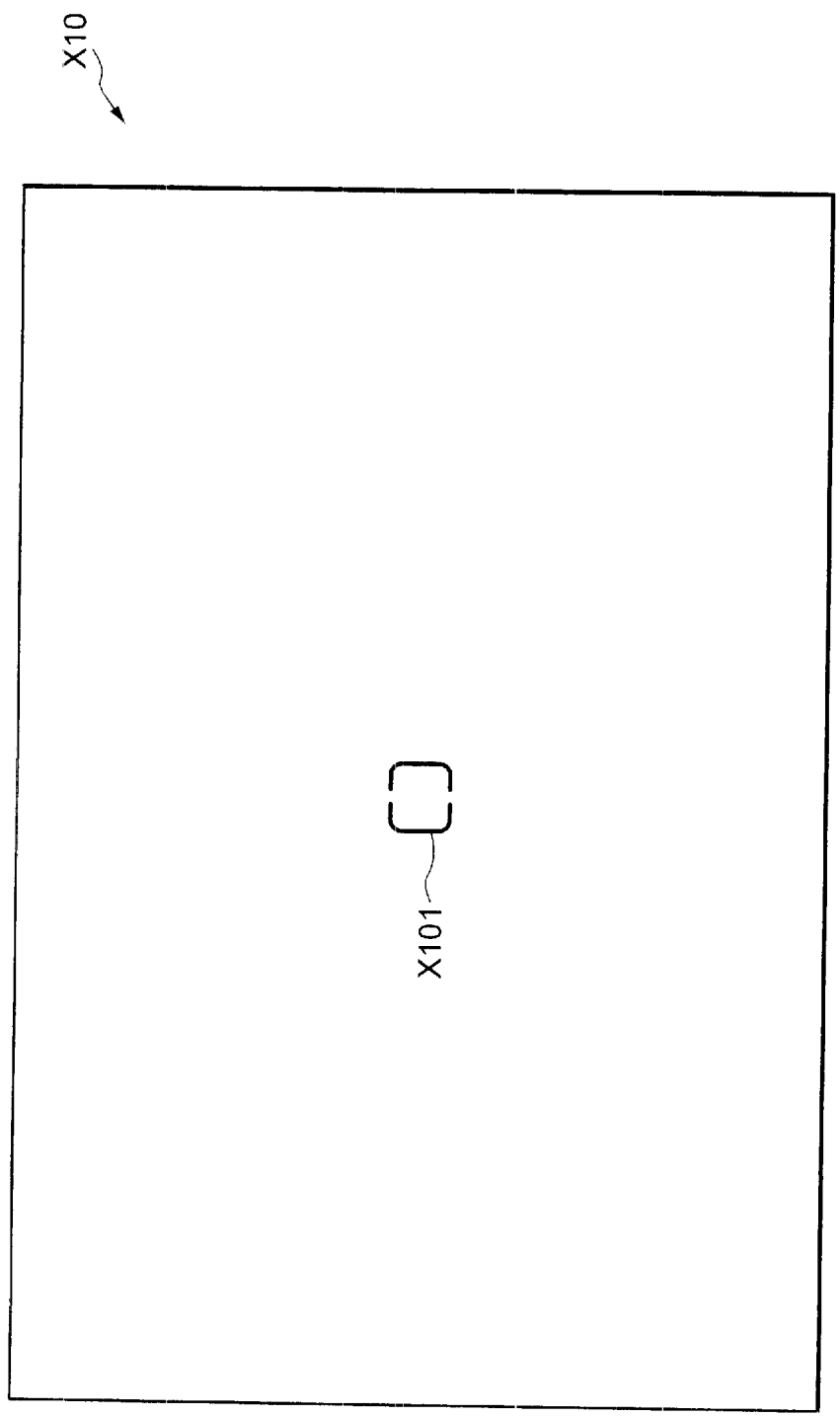
FIG. 12 illustrates a state of the display panel X10 of the liquid-crystal display illumination device according to the embodiment of the second invention.

The display panel X10 is, as described above, constituted of polymer-dispersed liquid crystal, and has, e.g., as shown in FIG. 11, five segments, segments X101 to X105. One of these segments X101 to X105 is selected by a selector X50. FIG. 12 shows a state in which a central segment X101 is selected by the selector X50.

This display panel X10 is driven by the drive circuit X7. The drive circuit X7 receives from the CPU X8 a signal for renewing drive, whereupon it brings a segment being in the light scattering state into the transparent state and also performs renewal processing to switch a designated segment from the transparent state to the dispersed state.

Incidentally, the drive circuit X7 is so constructed that it brightens the central segment X101 when a cell is first set in the camera.

Figure 13:
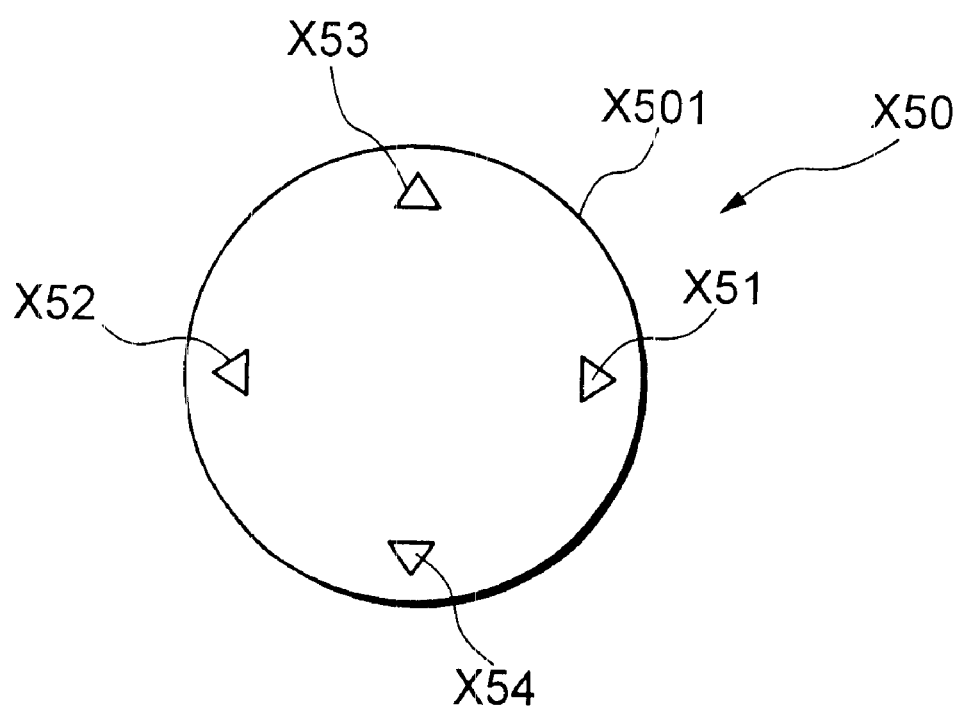
FIG. 13 illustrates a selector X50 of the liquid-crystal display illumination device according to the embodiment of the second invention.

FIG. 13 illustrates the selector X50 of the liquid-crystal display illumination device according to the present embodiment. As the selector X50, for example an AF area selector X501 may be used which is constituted of four switches X51 to X54 and detects which direction switch has been pressed among top-and-bottom and right-and-left directions.

How the camera shown in FIG. 9 acts will be described below.

The image light formed into an image on the screen X4 through the photo-taking lens X2 passes the background (background region) of the display panel X10 as it is, because the display panel X10 is disposed in proximity to this screen X4. Also, when any of areas other than the background of the display panel X10 (i.e., areas of the display segments X101 to X105) comes into the light scattering state, the light entering these areas is scattered in every direction, and hence only very small part of the light goes toward an eye. Thus, the quantity of light at this area lowers, and the area displayed looks dark compared with the background. Namely, the background and display patterns are optically superimposed in the display panel 10.

When no sufficient light reaches the screen X4, the light source X30 may be turned on to make illumination light enter the display panel 10 from its edge face X10a in a suitable quantity of light, whereby patterns can be displayed in the state that bright display patterns are superimposed on a dark background. In this case, the light is scattered at the area of a displayed segment (any of the display segments X101 to X105), and hence part of the illumination light is also scattered in the direction of an eye of a viewer, so that the displayed segment looks bright.

When, however, the camera subject to be phototaken has a sufficiently high luminance, even if the light source X30 is turned on to make illumination light enter the display panel 10 from its edge face X10a, the illumination light is too little compared with the luminance of the camera subject to provide any bright display pattern, so that dark display patterns are superimposed on a bright background.

How the camera acts to deal with any response delay of the polymer-dispersed liquid crystal by means of such a superimposable liquid-crystal display illumination device will be described below.

Figure 14:
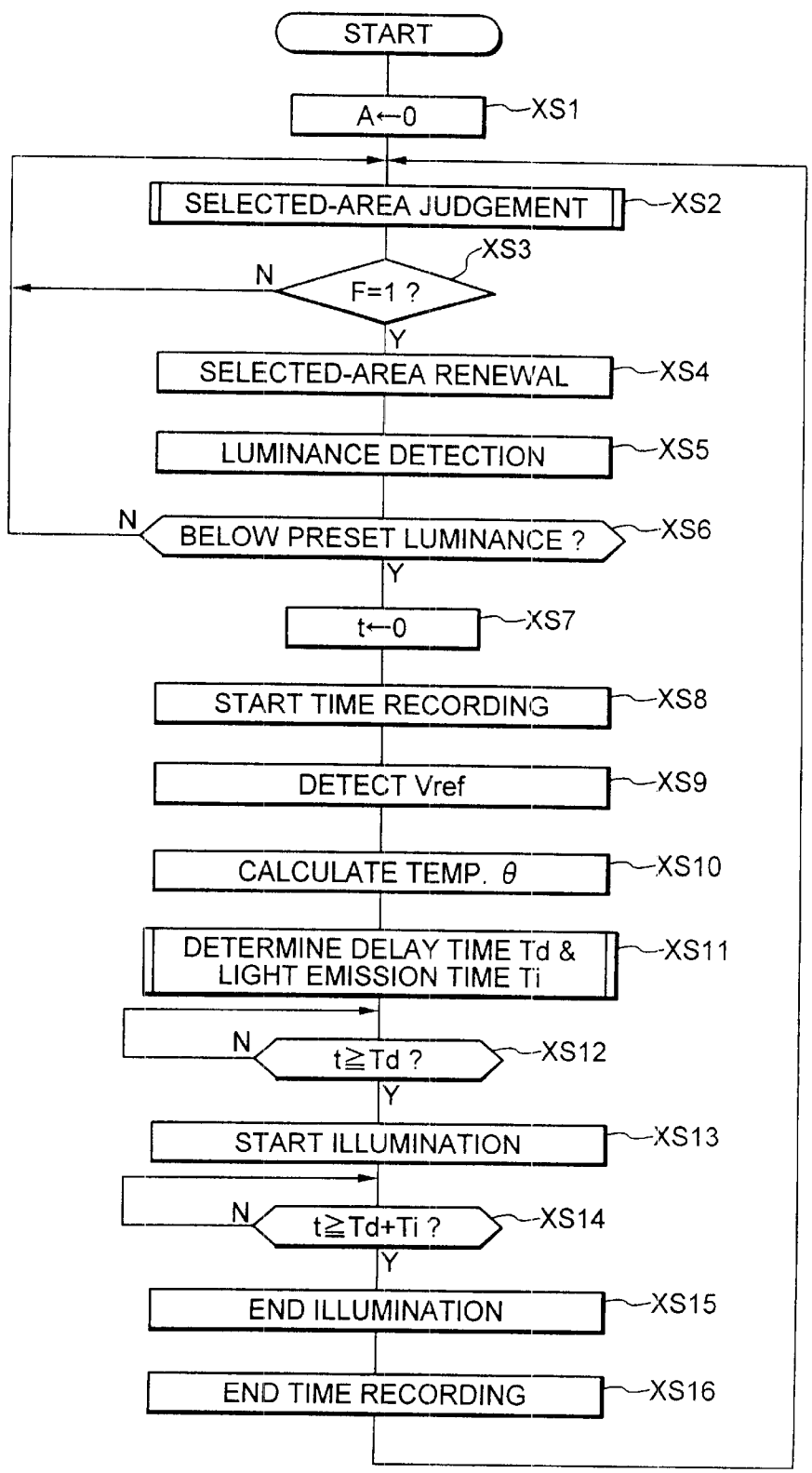
FIG. 14 is a flow chart showing the action of CPU (X8) (main routine) in the liquid-crystal display illumination device according to the embodiment of the second invention.
Figure 15:
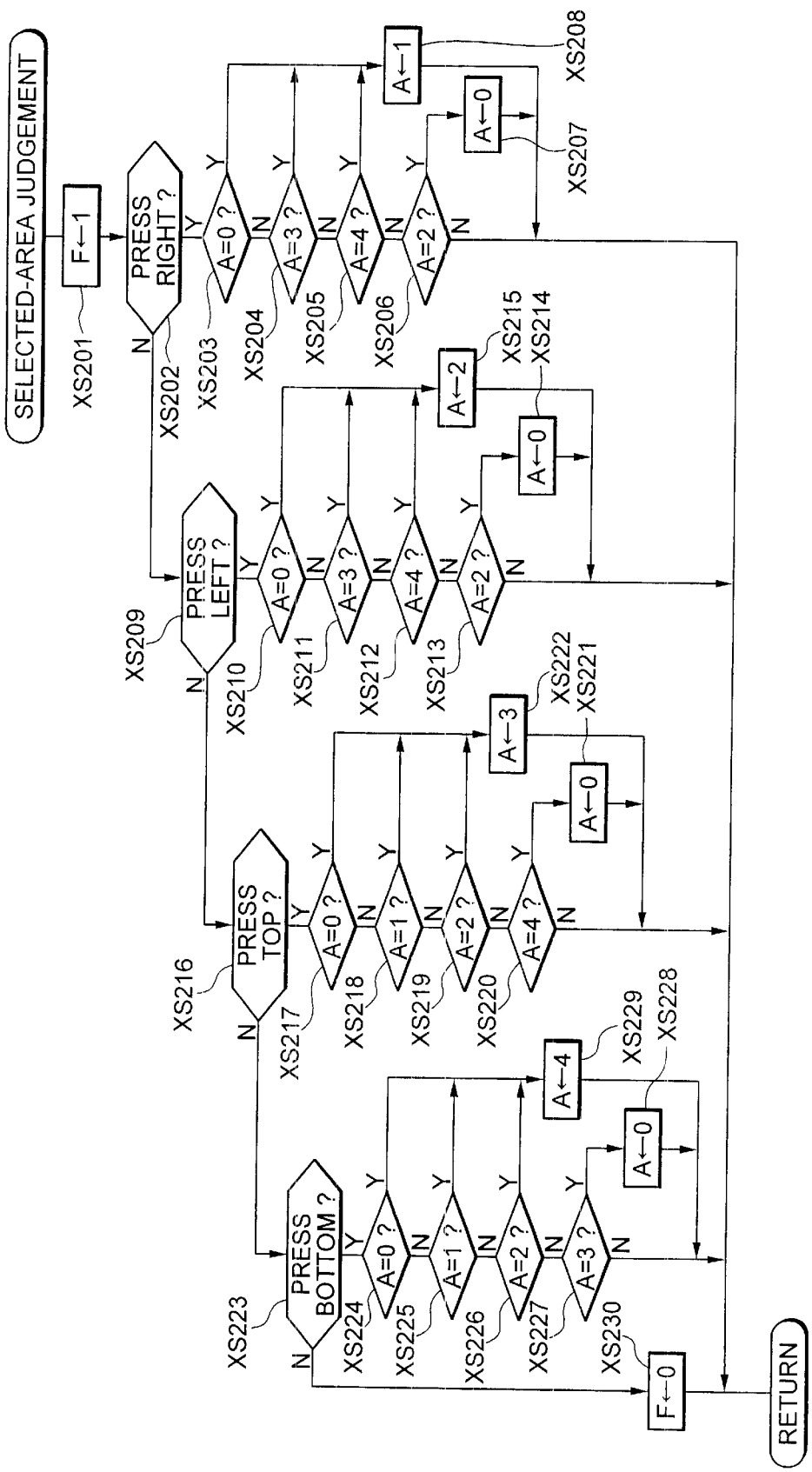
FIG. 15 is a flow chart showing the action of CPU (X8) (sub-routine for judging selected areas) in the liquid-crystal display illumination device according to the embodiment of the second invention.

FIGS. 14 to 16 are each a flow chart showing the action of CPU X8 in the liquid-crystal display illumination device according to the present embodiment. The action of the camera starts immediately after a battery is inserted, and a step XS1 is executed.

In the step XS1, "0" is entered into a parameter A. This parameter A indicates a selected segment, indicating that "0" is the center, "1" is the right, "3" is the top and "4" is the bottom. When the battery is inserted to the camera for the first time, the drive circuit X7 enters "0" into the parameter A as mentioned above, in order to bring the central segment X101 into the light scattering state.

In a step XS2, judgement is made on which direction the AF area selector X501 has been pressed in among top-and-bottom and right-and-left directions. This will be described in detail with reference to FIG. 15.

As shown in FIG. 15, in the step XS201, "1" is entered into a flag F. This flag F, in which "0" is entered when the AF area selector X501 stands not pressed in any direction among top-and-bottom and right-and-left directions, indicates whether or not the AF area selector X501 has been operated.

In steps XS202 to XS208, when the switch X51 is pressed, which segment be brought into the light scattering state next is determined depending on which segment has come into the light scattering state before that.

When any of segments of the center, top and bottom is in the light scattering state (A is "0", 3 or 4) under an existing condition, "1" is entered into the parameter A so that the right segment comes into the light scattering state. When the left segment is in the light scattering state (A is 2) under an existing condition, "0" is entered into the parameter A so that the central segment comes into the light scattering state. When the right segment is in the light scattering state (A is "1") under an existing condition, the light scattering state of the right segment may be retained, and hence the value of the parameter A is not changed.

In steps XS209 to XS215, the changing to the left side is processed in the same manner as the foregoing. In steps XS216 to XS222, the changing to the top side is processed in the same manner as the foregoing. In steps XS223 to XS229, the changing to the bottom side is processed in the same manner as the foregoing.

In a step XS230, when any of the switches is not pressed and the AF area selector X501 is not operated, "0" is entered into the flag F. Upon completion of the above, you proceed to a step XS3 shown in FIG. 14.

As shown in FIG. 14, the flag F is judged in the step XS3. When F is "0", the AF area selector X501 stands not operated, and you return to the step XS2. When F is "1", the AF area selector X501 has been operated, and you proceed to a step XS4.

In the step XS4, renewal signals are outputted to the drive circuit X7 so that the segment selected through the above step XS2 is displayed on the display panel X10 in the light scattering state. The drive circuit X7 having received the signals brings into the transparent state the segment kept in the light scattering state at present on the display panel X10 and at the same time outputs signals for bringing the selected segment into the light scattering state.

In a step XS5, the output of the photometric element X9 is received to calculate the luminance on the screen X4.

In a step XS6, judgement is made on whether or not the luminance on the screen X4 is below a preset value. If it is greater than the preset value, the screen is too dark compared with the brightness of a camera subject and hence any bright display pattern is not provided even if the LED X31 of the light source X30 is turned on. Accordingly, you return to the step XS2 without making any processing to light the LED X31. When it is below the preset value, the LED X31 of the light source X30 is turned on by the drive circuit X32 to make illumination light enter the display panel X10 from its edge face X10a, where a step XS7 and subsequent processing are performed in order to superimpose a bright display pattern on a dark background. Incidentally, as an example of the preset value of the luminance (Bv-Av0) on this screen X4, a value of about 2.5 is preferred when the apex value is used. Good results are obtainable at a value between 1 and 5.

In the step XS7, a time parameter t used in time recording is set to "0".

In a step XS8, time recording is started, and the time thus recorded is regarded as t.

In a step XS9, the absolute temperature proportional voltage $V_{ref}$ is detected through the photometric element X9.

In a step XS10, using the absolute temperature proportional voltage $V_{ref}$ detected through the XS9, the temperature θ (° C.) is calculated according to the equation (1) set out previously.

In a step XS11, delay time Td until the starting of light emission of the LED X31 and light emission time Ti of the LED X31 are determined on the basis of the temperature θ (° C.) calculated through the step XS10. This will be described in detail with reference to FIG. 16.

As shown in FIG. 16, in a step XS301, judgement is made on whether or not the temperature θ is higher than 5° C. When θ>5° C., you proceed to the step XS303. When θ≦5° C., you proceed to a step XS302.

In the step XS302, judgement is made on whether or not the temperature θ is higher than −5° C. When θ>−5° C., you proceed to a step XS304. When θ≦−5° C., you proceed to a step XS305.

In the step XS303, "50 ms" is entered into the delay time Td, and "300 ms" is entered into the light emission time Ti.

In the step XS304, "150 ms" is entered into the delay time Td, and "350 ms" is entered into the light emission time Ti.

In the step XS305, "600 ms" is entered into the delay time Td, and "500 ms" is entered into the light emission time Ti.

More specifically, here the delay time Td and the light emission time Ti are determined on the basis of the temperature θ in the manner as shown in the following table.

| θ ≦ −5° C. | −5° C. < θ ≦ −5° C. | 5° C. < θ |
|---|---|---|
| Td = 600 ms | Td = 150 ms | Td = 50 ms |
| Ti = 500 ms | Ti = 350 ms | Ti = 300 ms |

The reason why the delay time Td and the light emission time Ti are determined in this way is that the light emission of the LED X31 of the light source X30 is started after waiting by the time at which the segment kept into the light scattering state before the AF area selector X501 of the display panel X10 is operated comes into the transparent state, and also the superimposing can be achieved by illumination in such a way that the light emission is continued while the segment selected by the AF area selector X501 is changed from the transparent state into the light scattering state and thereby a bright display pattern is displayed in a dark background pattern without any sense of incongruity against a delay of the switching of segments of the display panel X10.

After the above processing has been completed, you proceed to a step XS12 shown in FIG. 14.

As shown in FIG. 14, in the step XS12, judgement is made on whether or not the recorded time t is not less than the delay time determined through XS11. When the former is less than the latter, you stay at the step XS12, and when the former is not less than the latter, you proceed to a step XS13.

In the step XS13, the LED X31 is started to light by the drive circuit X32 of the light source X30. This makes the brightened segment (any of the segments X101 to X105 shown in FIG. 13) of the display panel X10 look bright.

In a step XS14, judgement is made on whether or not the recorded time is not less than the total of the delay time Td and light emission time Ti determined through step XS11. When the former is less than the latter, you stay at the step XS14, and when the former is not less than the latter, you proceed to step XS15.

In the step XS15, the lighting of the LED X31 is ended by the drive circuit X32 of the light source X30.

After the AF area selector X501 has been operated through the above steps XS12 to XS15, the LED X31 of the light source X30 emits light only for the light emission time Ti after the delay time Td to illuminate to brighten the light scattering state segment of the display panel X10.

In a step XS16, the time recording started through the step XS8 is ended to return to the step XS2.

As described above in detail, in the present embodiment, the temperature is detected on the basis of the absolute temperature proportional voltage $V_{ref}$ detected through the photometric element X9 so that the delay time Td which is the timing to start light emission of the light source X30 and the light emission time Ti are determinable. Here, it is so designed that, before the AF area selector X501 of the display panel X10 of this liquid-crystal display illumination device is operated, the LED X31 of the light source X30 starts to emit light after the segment kept in the light scattering state has changed into the transparent state. Hence, any two segments are by no means illuminated simultaneously even when the polymer-dispersed liquid crystal comes to have a low temperature to become slow in response. Thus, the superimposable display attributable to illumination free of any sense of incongruity has been accomplished.

Namely, taking account of the temperature response behavior of polymer-dispersed liquid crystal that it changes faster from the light scattering state into the transparent state than from the transparent state into the light scattering state, the illumination of the display device making use of polymer-dispersed liquid crystal is so designed that the illumination is started with delay, corresponding to the response delay of liquid crystal because of temperature, in particular, the change form the light scattering state into the transparent state. Hence, any two segments are by no means illuminated simultaneously.

It is also so designed that the light is emitted in the course where the segment selected by the AF area selector X501 changes from the transparent state into the light scattering state. Hence, even when the liquid crystal comes to respond fairly slow because of low temperature, the light source emits light with a little delay so that a user may hardly notice any delay in the timing of light emission. Thus, the superimposable display attributable to illumination more free of any sense of incongruity has been accomplished.

That is, since in a low-temperature region the illumination is so designed as to be started after the change from the light scattering state into the transparent state has been completed in the polymer-dispersed liquid-crystal display device and also in the course of the change from the transparent state into the light scattering state, in particular, since the illumination is so designed as to be made by a light source that can respond faster than the delay in response of the polymer-dispersed liquid crystal at a low temperature, a liquid-crystal display device making the response of liquid crystal hardly conspicuous and giving less sense of incongruity can be provided.

As described above in detail, in the present embodiment, the delay time and light emission time until the illumination part starts to emit light are so designed as to be changeable depending on the temperature of liquid-crystal layer. Hence, the selected segment can accurately be illuminated.

A first embodiment of the third invention of the present application will be described below with reference to FIGS. 17A to 29.

In the present embodiment, the third invention is described taking the case of a polymer-dispersed liquid-crystal display panel, but is by no means limited thereto, and is likewise applicable also to polymer network type liquid crystals and so forth.

The construction of the liquid-crystal display device according to the present embodiment and its display action are described first.

Figure 18:
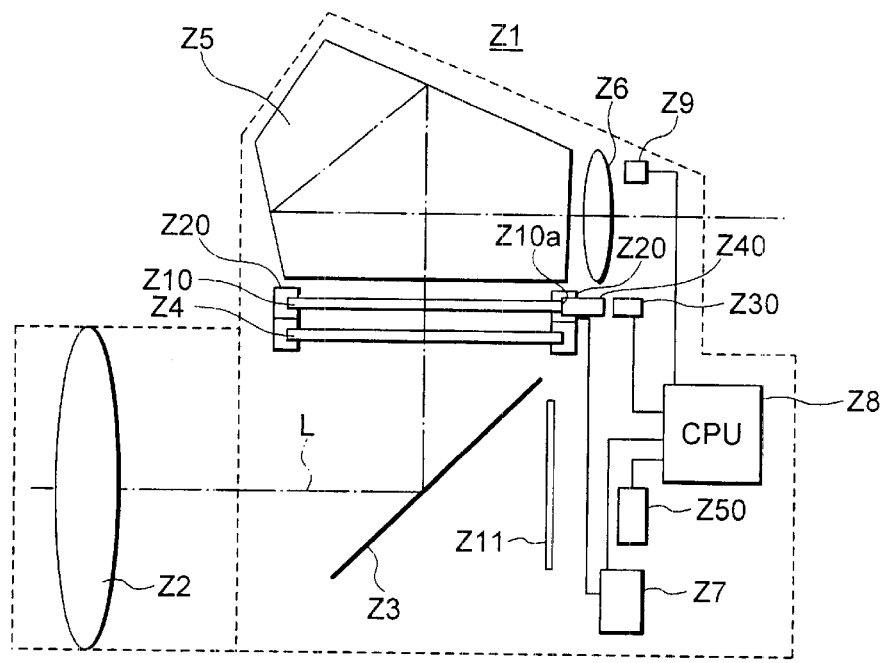
FIG. 18 illustrates the structure of a single-lens reflex camera incorporated with the liquid-crystal display device.

The liquid-crystal display device according to the present embodiment is constituted of a rectangular and flat-plate liquid-crystal display panel Z10, a frame-like holder (holding member) Z20 which fixes the liquid-crystal display panel Z10 at its surrounding, a light source Z30 for illuminating the liquid-crystal display panel Z10, a guide path (light guide means) Z40 which guides the light emitted from the light source Z30, to the surrounding of the liquid-crystal display panel Z10 in branches, a focus area selector Z50, a drive circuit Z7, and a CPU Z8 (see FIG. 18).

Figure 17A:
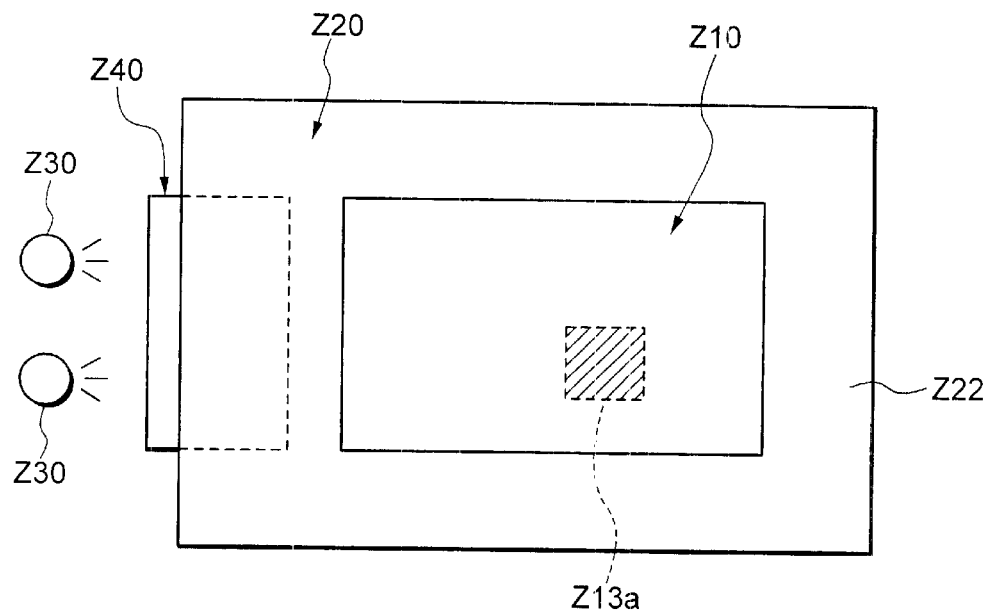
FIGS. 17A and 17B are a plan view and a sectional side view, respectively, illustrating the structure of a display panel provided in a liquid-crystal display device according to a first embodiment of the third invention of the present application.
Figure 17B:
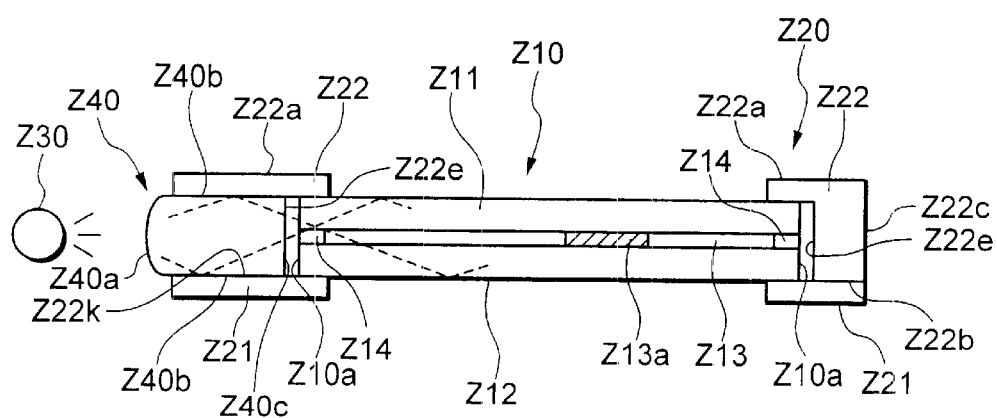

Of these, the liquid-crystal display panel Z10 has, as shown in FIGS. 17A and 17B, a structure wherein a polymer-dispersed liquid crystal Z13 is held in a space between a pair of transparent substrates (substrates made of glass or transparent resin) Z11 and Z12. The polymer-dispersed liquid crystal Z13 is sealed by means of the transparent substrates Z11 and Z12 and a sealing material Z14 provided around the liquid-crystal display panel Z10.

Between the polymer-dispersed liquid crystal Z13 and the upper-side transparent substrate Z11 and between the polymer-dispersed liquid crystal Z13 and the lower-side transparent substrate Z13, very thin transparent electrodes (not shown; formed of transparent electrode layers) are respectively formed which are each comprised of ITO (indium-tin oxide).

These transparent electrodes may appropriately be formed at necessary regions of the liquid-crystal display panel Z10 so that any desired region (e.g., a display segment Z13a shown in FIGS. 17A and 17B) of the polymer-dispersed liquid crystal Z13 can be brought into the display state (light scattering state) or the non-display state (light non-scattering state).

Here, the principle of action to switch the display segment Z13a between the display state (light scattering state) and the non-display state (light non-scattering state) is described below briefly.

The polymer-dispersed liquid crystal Z13 is comprised of a polymer/liquid crystal composite material in which a liquid crystal has been dispersed in a polymer, and is a material in which the refractive index of liquid crystal is changed by an electric-field effect to cause a change in the degree of light scattering. Hence, when a voltage which is substantially zero (zero voltage) is applied to the transparent electrodes provided in pair to hold the polymer-dispersed liquid crystal Z13 between them, the polymer-dispersed liquid crystal Z13 comes into a state where no electric field is applied, to scatter incident light (light scattering state). Thus, the application of zero voltage to an electrode corresponding to the display segment Z13a causes the display segment Z13a to scatter light to distinguish it from the surrounding area.

On the other hand, when a voltage of a given level or higher is applied to the transparent electrodes provided in pair, the polymer-dispersed liquid crystal Z13 comes into a state where a voltage is applied, to make the light not scatter (light non-scattering state). Thus, the application of an appropriate voltage to the transparent electrode corresponding to the display segment Z13a brings the display segment Z13a into the light non-scattering state to make it undistinguishable from the surrounding area.

Here, when the display segment Z13a is made distinguishable from the surrounding area, the transparent electrode layer may be removed by etching in the shape of the contours of the display segment Z13a, whereby the electric field Z13a becomes controllable in the state only the display segment Z13a is independent from the surrounding area.

The holder Z20 for fixing the liquid-crystal display panel Z10 consists of a lower-side frame Z21 and an upper-side frame Z22, and the edge of the surrounding of the liquid-crystal display panel Z10 is held between the both frames Z21 and Z22.

This lower-side frame Z21 is formed of an opaque material. On the other hand, the upper-side frame Z22 is formed of a transparent resin material such as acrylic resin, and its top surface Z22a, bottom surface Z22b and outside surface Z22c are coated in black so that the light does not leak outside. Also, at a hollow on the inner-peripheral side of the upper-side frame Z22, an inside surface Z22e not coated is formed. The inside surface Z22e is not coated so that the light having traveled the interior of the upper-side frame Z22 can exit to the side of an edge face Z10a of the liquid-crystal display panel Z10.

The guide path (light guide means) Z40 is embedded to the upper-side frame Z22 which is the main part of the holder Z20. More specifically, a rectangular opening Z22k is formed at one side of the upper-side frame Z22, where the guide path Z40 is fitted to this opening Z22k and is fixed in this state.

The guide path (light guide means) Z40 is formed of, e.g., a transparent material such as acrylic resin or glass, and a light-incident face Z40a on one end has a cylindrical lens face.

The sidewalls Z40b of this guide path (light guide means) Z40 have been subjected to vacuum deposition of aluminum to prevent illumination light from leaking outside. Incidentally, with regard to the sidewalls Z40b, they may only shield light, without providing mirror surfaces.

The illumination light from the light source Z30 enters the guide path Z40 through the light-incident face Z40a. The illumination light having entered the guide path Z40, being reflected on the sidewalls Z40b, exits an light-emergent face Z40c. Here, the angle at which the illumination light exiting the light-emergent face Z40c spreads (spread angle) is narrowed within a preset range.

The illumination light having exited the light-emergent face Z40c at a preset spread angle enters the liquid-crystal display panel Z10 from its edge face Z10a to illuminate the polymer-dispersed liquid crystal Z13. When no electric field is applied to the display segment Z13a, this area comes into the light scattering state, and is displayed by the aid of the illumination light and in a color corresponding to the color of the illumination light.

Incidentally, in place of embedding the guide path Z40 in the upper-side frame Z22 on its short-side side, the guide path Z40 may be embedded in the upper-side frame Z22 on its long-side side. This can make any uneven illumination (the side near to the guide path Z40 is strongly illuminated and the side far from the guide path Z40 is weakly illuminated) occur with difficulty.

The liquid-crystal display device constructed in this way is incorporated in, e.g., a single-lens reflex camera Z1 (FIG. 18) having a plurality of autofocus areas.

The single-lens reflex camera Z1 has, as shown in FIG. 18, a photo-taking lens Z2 for forming an image of a camera subject to be phototaken on a film Z11, a spring-up type reflecting mirror Z3 for changing the optical path L of light coming from the photo-taking lens Z2, a screen Z4 disposed on the plane that is conjugate to the film, a liquid-crystal display panel Z10 disposed in proximity to this screen Z4, a penta-prism Z5 through which the light transmitted through the screen Z4 and display panel Z10 is bent, an eyepiece Z6 for viewing an image projected on the screen Z4, and a photometric element Z9. Here, the display panel Z10 is held with holders Z20 and fixed to the camera.

Figure 19:
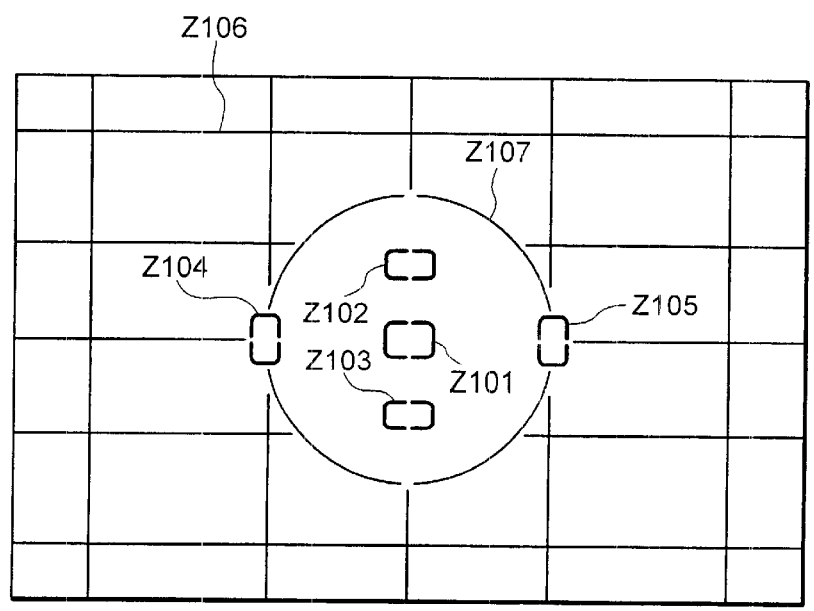
FIG. 19 is a plan view showing a display form of a liquid-crystal display panel Z10.

The liquid-crystal display panel Z10 to be incorporated in the single-lens reflex camera Z1 is provided with, as shown in FIG. 19, a plurality of indication segments Z101 to Z105 (corresponding to five focus areas), a display segment Z106 showing lattice lines for composition, and a display segment Z107 showing a circle line for photometry, which are provided as display segments.

Of these, with regard to the five indication segments Z101 to Z105, a focus area selector Z50 (see FIG. 25) is operated at the time of autofocus control, whereby one of them is selected to come into the light scattering state, and the selected indication segment (focus area) is displayed.

The drive circuit Z7 drives the liquid-crystal display panel Z10 into the desired display form (the light non-scattering state or light scattering state of the indication segments Z101 to Z105 and display segments Z106 and Z107).

The CPU Z8 determines the display form of the liquid-crystal display panel Z10 in accordance with signals from the focus area selector Z50 and also from an AE unit or AF unit (both not shown), and outputs control signals showing the display form, to the drive circuit Z7 to control the display form in the liquid-crystal display panel Z10.

The photometric element 9 is a photoelectric transducer which detects the luminance of a camera subject to be phototaken (here, the luminance of the vicinity of the liquid-crystal display panel Z10), and output signals showing the luminance detected are outputted to the CPU Z8.

In the single-lens reflex camera Z1 thus constructed, the liquid-crystal display panel Z10 is disposed in proximity to the screen Z4, and hence the image formed on the screen Z4 by the photo-taking lens 2 passes through the background (background region) of the liquid-crystal display panel Z10 as it is. Here, where any of the display segments (indication segments Z101 to Z105 and display segments Z106 and Z107) of the liquid-crystal display panel Z10 has been selected to come into the light scattering state, the light entering that area is scattered (scattered in every direction) and the light traveling in the direction of the eyepiece Z6 is in a small quantity.

As the result, the selected display segment (any of the indication segments Z101 to Z105 and display segments Z106 and Z107) looks dark compared with the background, so that the background and display segment thus selected are optically superimposed.

When no sufficient light reaches the screen Z4, the light source Z30 may be turned on to make the illumination light enter the liquid-crystal display panel Z10 from its edge face Z10a, whereby patterns can be displayed in the state a bright display pattern is superimposed on a dark background.

In the present embodiment, the selected indication segment (any of the indication segments Z101 to Z105 and display segments Z106 and Z107) looks bright by turning the light source Z30 on. This is because the light is scattered at the indication segment (any of the segments Z101 to Z105) which is in the light scattering state and hence part of the illumination light is also scattered in the direction of the eyepiece Z6.

Figure 20:
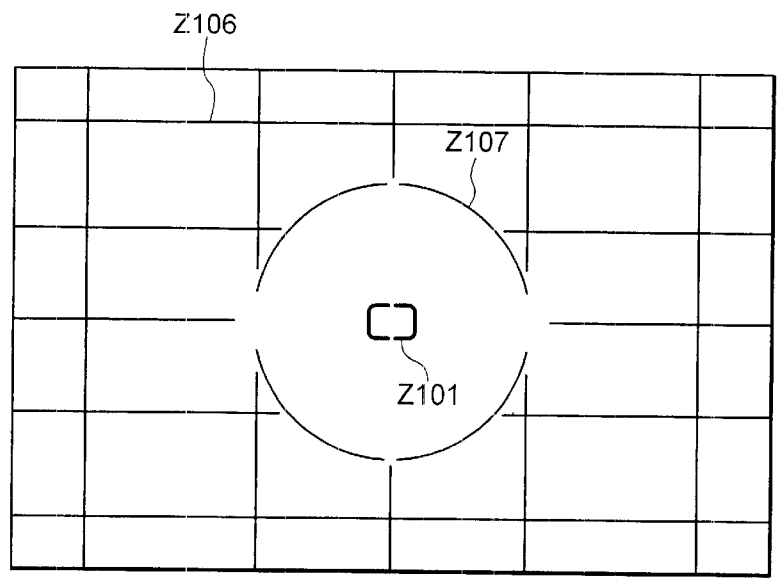
FIG. 20 is a plan view showing a display form of the liquid-crystal display panel Z10.
Figure 21:
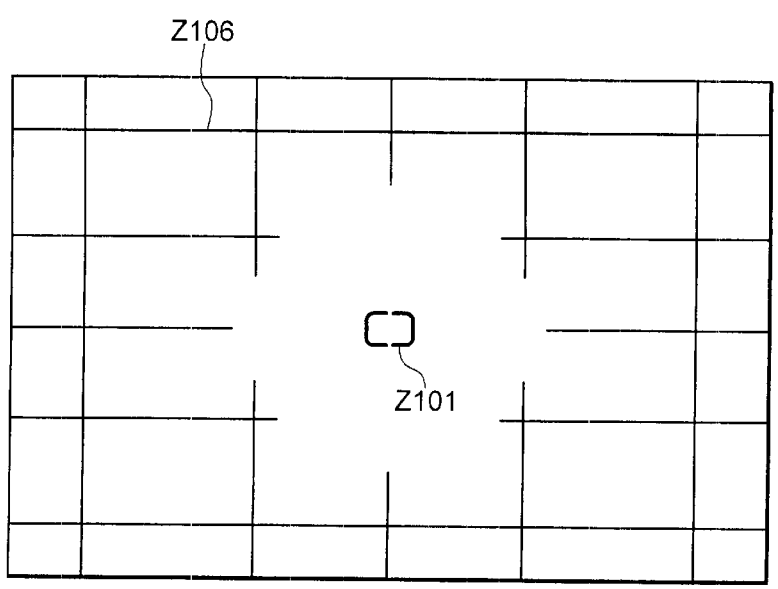
FIG. 21 is a plan view showing a display form of the liquid-crystal display panel Z10.
Figure 22:
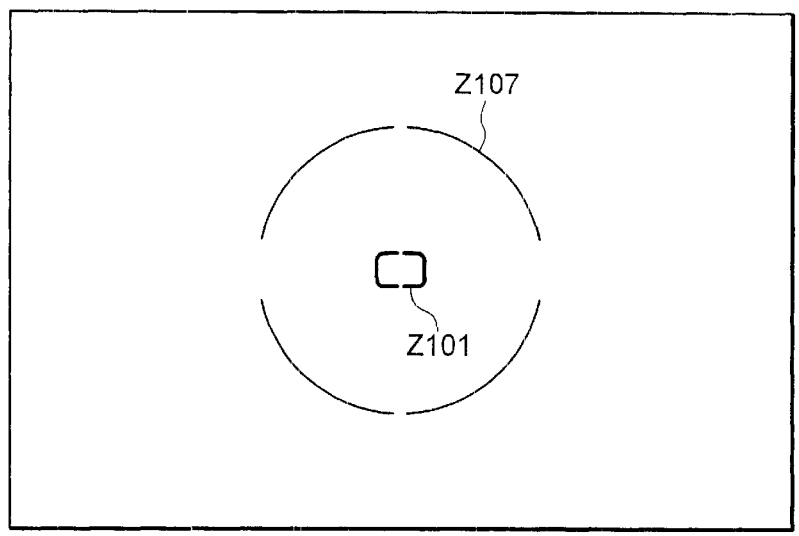
FIG. 22 is a plan view showing a display form of the liquid-crystal display panel Z10.
Figure 23:
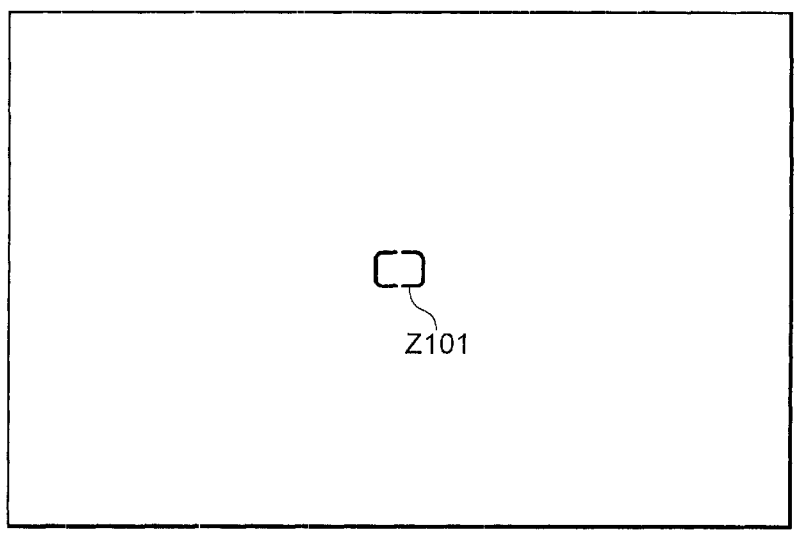
FIG. 23 is a plan view showing a display form of the liquid-crystal display panel Z10.

FIGS. 19 to 23 show display forms of the liquid-crystal display panel Z10. Of these, FIG. 19 shows a condition in which all the display segments (indication segments Z101 to Z105 and display segments Z106 and Z107) have been selected to come into the light scattering state; FIG. 20, a condition in which the indication segment Z101 and display segments Z106 and Z107 have been selected to come into the light scattering state; FIG. 21, a condition in which the indication segment Z101 and display segment Z106 have been selected to come into the light scattering state; FIG. 22, a condition in which the indication segment Z101 and display segment Z107 have been selected to come into the light scattering state; and FIG. 23, a condition in which only the indication segment Z101 has been selected to come into the light scattering state. Here, any one of the indication segments Z101 to Z105 may be selected to come into the light scattering state and the other display segments come into the light non-scattering state (FIGS. 20 to 23 each show a condition in which the indication segment Z101 has always been selected).

Figure 24:
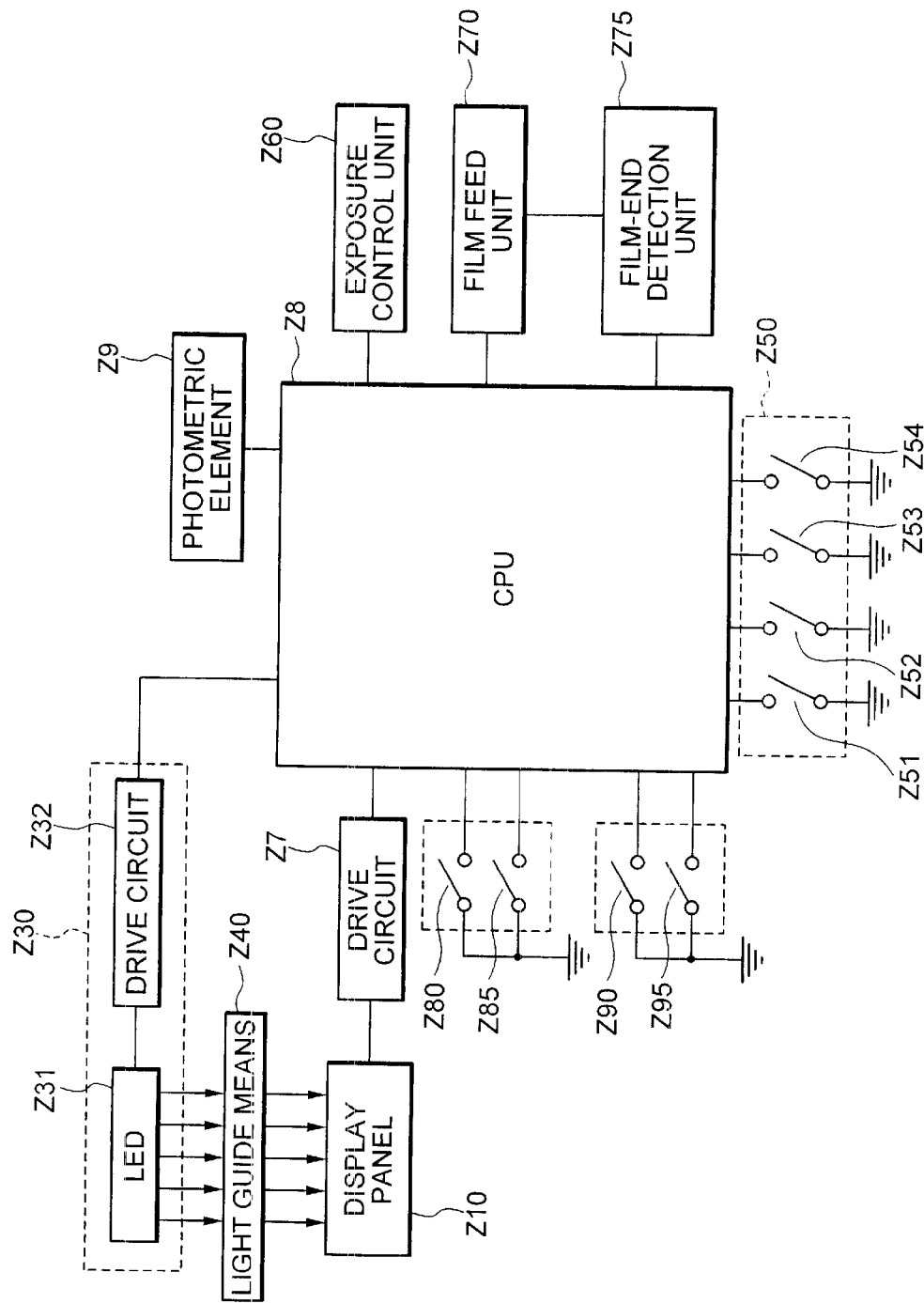
FIG. 24 is a block diagram schematically showing the circuit construction of the whole action control section of a single-lens reflex camera.

FIG. 24 is a block diagram schematically showing the circuit construction of the whole action control section of the single-lens reflex camera Z1.

As shown in FIG. 24, the action control section of the single-lens reflex camera Z1 constitutes part of the liquid-crystal display device, too, and is constituted basically of a CPU Z8, a drive circuit Z32 of the light source Z30 connected to the CPU Z8, a drive circuit Z7 which drives the liquid-crystal display panel Z10, a half-press-down switch Z80, a full-press-down switch (release switch) Z85, a lattice-line selection switch Z90, a circle-line selection switch Z95, focus area selection switches Z51 to Z54, a photometric element Z9, an exposure control unit Z60, a film-feed unit Z70 and a film-end detection unit Z75.

Of these, the drive circuit Z7 receives control signals (signals for renewing the display forms of the indication segments Z101 to Z105 and display segments Z106 and Z107) sent from the CPU Z8, whereupon, in accordance with the contents of the control signals, it performs renewal action to switch an already selected, light scattering state display segment (any of the indication segments Z101 to Z105 and display segments Z106 and Z107) into the light non-scattering state or to switch an anew selected display segment (any of the indication segments Z101 to Z105 and display segments Z106 and Z107) into the light scattering state from the light non-scattering state. Incidentally, in the initial state (when the power source of the single-lens reflex camera Z1 is turned on), the CPU Z8 is so designed as to output to the drive circuit Z7 a control signal such that the display segment Z101 at the center (FIG. 19) be lighted.

The switches Z51 to Z54 are those for detecting the selected direction (among top-and-bottom and right-and-left directions) in accordance with top-and-bottom and right-and-left operations of the focus area selector Z50. Signals showing the results of detection are sent to the CPU Z8.

The photometric element Z9 measures the light transmitted through the photo-taking lens Z2, turned by the reflecting mirror Z3 and scattered through the screen Z4 disposed on the plane that is conjugate to the film Z11. Output signals showing the resultant luminance are sent to the CPU Z8.

The light source Z30 is constituted of an LED Z31 and a drive circuit Z32 for driving this LED Z31, and is so designed that the light from the LED Z31 is guided to the edge face Z10a of the liquid-crystal display panel Z10 by means of the guide path (light guide means) Z40.

The exposure control unit Z60 is constituted of a shutter, a diaphragm, a diaphragm controller and a drive circuit which drives these (all not shown). This exposure control unit Z60, when instructed to take a photograph by pressing down a release button (not shown), exposes the film Z11 to light (takes a photograph) according to control signals from the CPU Z8 which represent shutter speed/diaphragm stop, and at the shutter speed/diaphragm stop presented by the control signals.

The feed unit Z70 performs initial-feed action which determines the position of the first frame of a film when the film Z11 is loaded. This feed unit Z70 performs the action to wind up the film to forward the film Z11 frame by frame after photo-taking on one frame, in accordance with control signals from the CPU Z8, and the action to rewind the film to wind up the film Z11 into a cassette.

The film-end detection unit Z75 is connected with the feed unit Z70 and detects that the film Z11 has been wound up to an end. Output signals showing the results of detection are sent to the CPU Z8.

The half-press-down switch Z80 is turned on when the release button (not shown) is half-pressed down, and is turned off upon cancellation of the half-press-down of the release button. Signals from the half-press-down switch Z80 which show the state of half-press-down are sent to the CPU Z8, and the CPU Z8 recognizes the state of half-press-down and makes the camera power source turned on. Incidentally, this state where the power source is turned on is retained for a given time even after the release button returns to the original position and the half-pressed-down state is cancelled.

The release switch Z85 is turned on when the release button (not shown) is full-pressed down, and is turned off upon cancellation of the press-down of the release button. When this release switch Z85 is turned on, signals showing to that effect are sent to the CPU Z8, and the CPU Z8 determines the shutter speed, diaphragm stop and so forth, whereupon the film Z11 is exposed.

The lattice-line selection switch Z90 is turned on upon press-down of a lattice-line selection button (not shown), and is turned off upon cancellation of the press-down of the button. When the lattice-line selection switch Z90 is turned on in the state the lattice lines for composition (display segment Z106 shown in FIG. 19) are not displayed, signals showing to that effect are sent to the CPU Z8, and the CPU Z8 brings the display segment Z106 showing the lattice lines for composition, into the display state (light scattering state). Also, when the lattice-line selection switch Z90 is turned on in the state the lattice lines for composition (display segment Z106) are displayed, signals showing to that effect are sent to the CPU Z8, and the CPU Z8 cancels the display state (light non-scattering state) of the lattice lines for composition (display segment Z106).

The circle-line selection switch Z95 is turned on upon press-down of a circle-line selection button (not shown), and is turned off upon cancellation of the press-down of the button. When the circle-line selection switch Z95 is turned on in the state the circle line for photometry (display segment Z107 shown in FIG. 19) is not displayed, signals showing to that effect are sent to the CPU Z8, and the CPU Z8 brings the circle line for photometry (display segment Z107) into the display state (light scattering state). On the other hand, when the circle-line selection switch Z95 is turned on in the state the circle line for photometry (display segment Z107) is displayed, signals showing to that effect are sent to the CPU Z8, and the CPU Z8 cancels the display state (light non-scattering state) of the circle line for photometry (display segment Z107).

The drive control of display segments (indication segments Z101 to Z105 and display segments Z106 and Z107) by the CPU Z8 is described below with reference to the flow charts of FIGS. 26 to 29.

Figure 26:
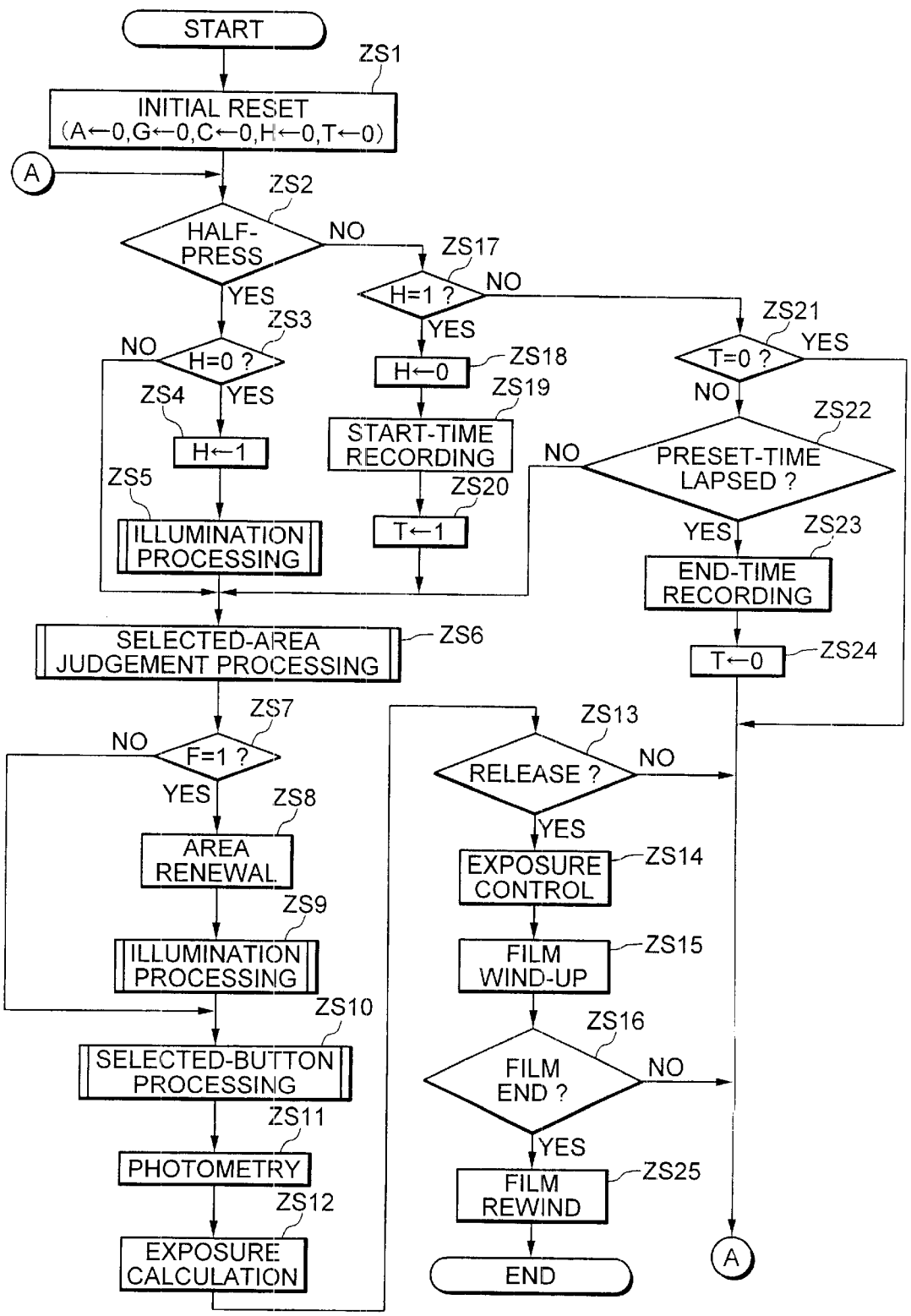
FIG. 26 is a flow chart showing the main program for controlling the whole action of a single-lens reflex camera.

FIG. 26 is a flow chart showing the main program for controlling the whole action of the single-lens reflex camera Z1.

The main program is started when a battery (not shown) is inserted to the single-lens reflex camera Z1.

Upon start of the main program, first, in a step ZS1, various parameters and flags used for controlling the action of the camera are initially reset ("parameter A" is set to "0", and "flag G", "flag C", "flag H" and "flag H" are each set to "0").

Here, the parameter A indicates which focus area (indication segments Z101 to Z105 shown in FIG. 13) has been selected by selected-area processing (FIG. 28) executed in a step ZS6, described later. When its value is "0", it indicates that the central indication segment Z101 has been selected; when "1", the right indication segment Z105; when "2", the left indication segment Z104; when "3", the upper indication segment Z102; and when "4", the lower indication segment Z103.

The flag G indicates whether or not the lattice lines for composition shown in FIG. 19 (display segment Z106) be displayed. When be not displayed, it is set to "0"; and when be displayed, "1".

The flag C indicates whether or not the circle line for photometry shown in FIG. 19 (display segment Z107) be displayed. When be not displayed, it is set to "0"; and when be displayed, "1".

The flag H indicates whether or not the single-lens reflex camera Z1 is in the state of photo-taking stand-by for setting photo-taking conditions. When the release button (not shown) is half-pressed down and the half-press-down switch Z80 is turned on, it is set to "1"; and when the half-pressed-down is cancelled, "1".

The flag T is a flag used for feeding power for a preset time after cancellation of the half-press-down. It is set to "1" during this preset time (during half-press time recording), and set to "1" after lapse of the present time (after end of half-press time recording).

After the various parameters and flags have been initially reset in the step ZS1, judgement is made in a step ZS2 on whether or not the release button (not shown) has been half-pressed down (judgement on whether or not the half-press-down switch Z80 is turned on).

When the half-press-down switch Z80 is not yet turned on after the main program has been started, the result of judgement in this step ZS2 is "No", and judgement is made in a step ZS17 on whether or not the flag H is "1" and also in a step ZS21 on whether or not the flag T is "0".

When the half-press-down switch Z80 is not pressed down after the main program has been started, each flag stands reset in the step ZS1, and hence the result of judgement in the step ZS17 is "No" and the result of judgement in the step ZS21 is "Yes", and you return to the step ZS2.

When the half-press-down switch Z80 is turned on for the first time after the main program has been started, the result of judgement in the step ZS2 turns to "Yes", and you proceed to a step ZS3.

In the step ZS3, judgement is made at this point of time on whether or not the flag H is "0". In this case (the half-press-down switch Z80 is turned on for the first time in the present loop), the result of judgement in the step ZS3 is "Yes", and the flag H is set to "1" in a step ZS4. Then, you proceed to a step ZS5, where illumination processing (FIG. 27) as will be detailed later is executed in order to make it easy to make sure of the indication (any of the indication segments Z101 to Z105) standing selected at this point of time. Thereafter, you proceed to processing in a step ZS6 and subsequent steps.

Meanwhile, when the second and subsequent loops are executed while the half-press-down switch Z80 is on, the result of judgement in the step ZS3 turns to "No", where the steps ZS4 and ZS5 are skipped, and you proceed to a step ZS6 and subsequent steps.

When the half-press-down is cancelled after the release button (not shown) has been half-pressed down, photo-taking preparation time is measured in order to determine photo-taking conditions.

More specifically, the half-press-down switch Z80 is turned off, whereupon the result of judgement in the step ZS2 becomes "No", and judgement is made in a step ZS17 on whether or not the flag H is "1". At this point of time, the flag H is set to "1" in the step ZS4, and hence the result of judgement in the step ZS17 becomes "Yes", and you proceed to a step ZS18, where the flag H is again set to "0".

In the next step ZS19, a timer which records the photo-taking preparation time (a preset time) is actuated to start the time recording, and in a step ZS20 the flag T showing that the timer is under counting is set to "1", where processing in the step ZS6 and subsequent steps is executed.

Thus, the timer which records the photo-taking preparation time starts to operate and a state where the half-press-down switch Z80 does not switch is continued, whereupon in the next and subsequent loops the results of judgement in the step ZS2 and 21 both become "No", and judgement is made in a step ZS22 on whether or not the photo-taking preparation time (a preset time) has lapsed.

While the result of this judgement is kept "No", the processing in the step ZS6 and subsequent steps is executed as it is.

When the photo-taking preparation time (a preset time) lapses after the half-press-down switch Z80 has switched from ON to OFF, the result of judgement in the step ZS22 turns to "Yes", and the recording of the photo-taking preparation time is ended (step ZS23). Thereafter, the flag T is set to "0" (step ZS24) to end the present loop.

Thus, upon start of the main program, processing in the step ZS6 and subsequent steps is executed while the half-press-down switch Z80 is on, and over the preset time (photo-taking preparation time) after the on-state of the half-press-down switch Z80 has been cancelled.

In the processing in the step ZS6 and subsequent steps, first in the step ZS6, selected-area judgement processing (FIG. 28) is executed, and the parameter A is set to a value (any of "0" to "4") which shows the focus area selected by a photographer. Incidentally, the focus area selected here is set to an autofocus region by autofocus control (description is omitted), and the autofocus is executed on the basis of the image formed in this focus area.

Figure 27:
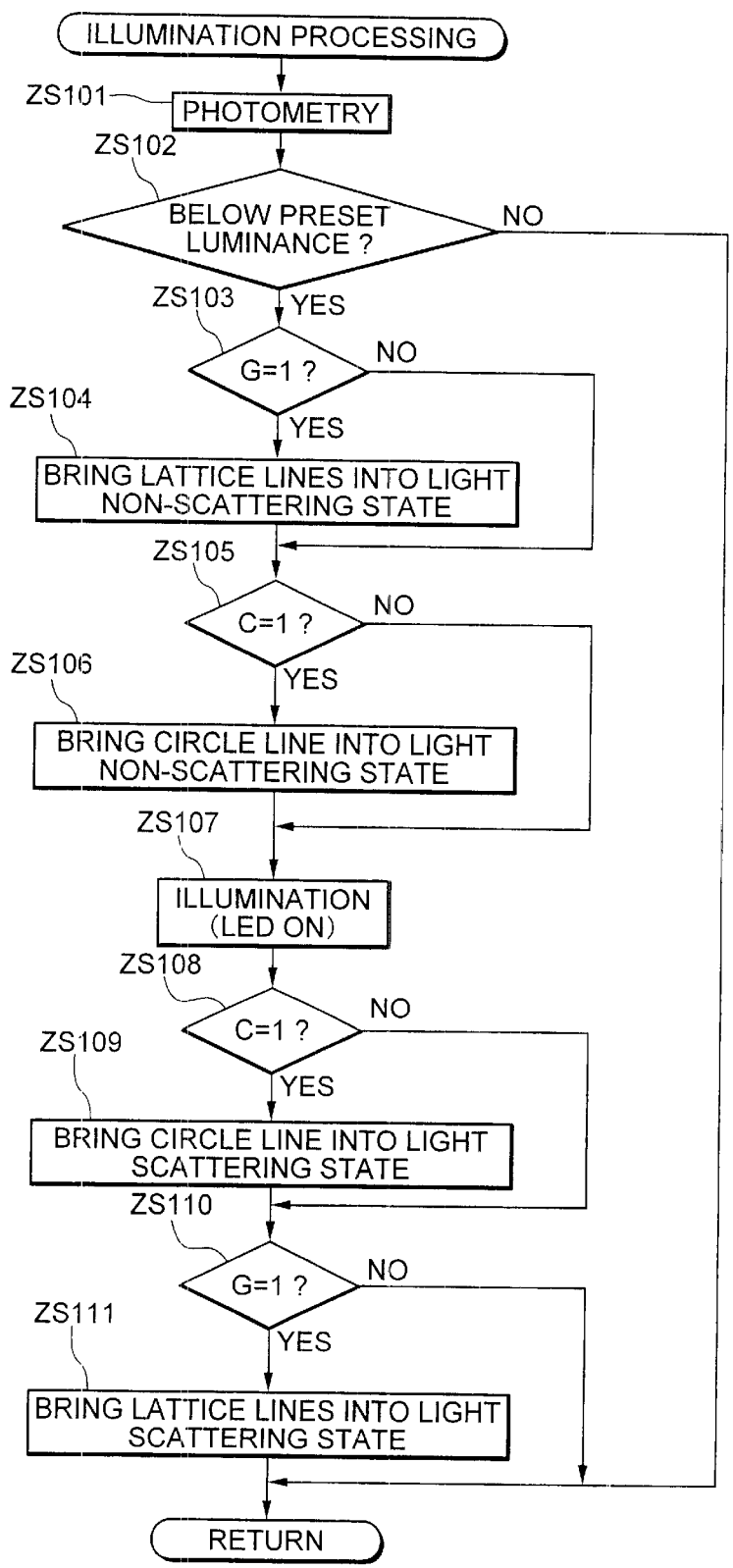
FIG. 27 is a flow chart showing illumination processing executed in the main program.
Figure 28:
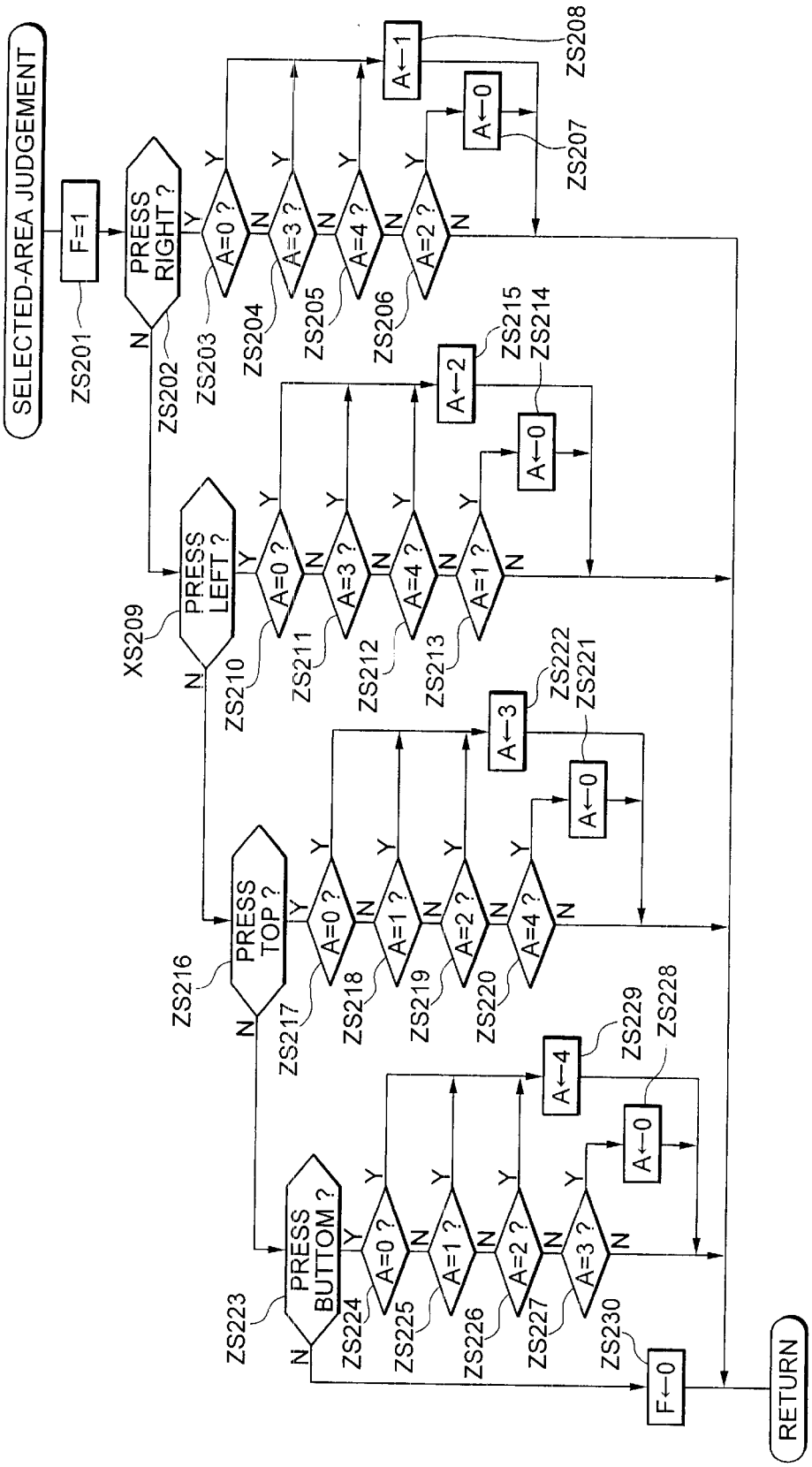
FIG. 28 is a flow chart showing selected-area judgement processing executed in the main program.

In a step ZS7, judgement is made on whether or not the flag F is "1". This flag F is, as described above, set to "1" when the value of the parameter A is changed, and "0" when not changed, in the selected-area judgement processing (FIG. 28). Accordingly, where the parameter A has been changed in the present loop (the result of judgement in the step ZS7 is "Yes"), the area is renewed in a step ZS8, and the same illumination processing (FIG. 27) as in the step ZS5 is executed so that the area thus renewed can clearly be displayed. Thereafter, you proceed to a step ZS10.

Meanwhile, when no area is selected over the previous loop up to the present loop, the result of judgement in the step ZS7 is "No", where the steps ZS8 and ZS9 are skipped, and you proceed to the step ZS10.

In the step ZS10, selected-button processing (FIG. 29) is executed to determined whether or not the lattice lines for composition (display segment Z106) and/or the circle line for photometry (display segment Z107) be displayed (light scattering state).

By this selected-button processing, whether or not either the lattice lines for composition (display segment Z106) or the circle line for photometry (display segment Z107) be brought into the light scattering state or light non-scattering state is judged in accordance with the state of the lattice-line selection switch Z90 and circle-line selection switch Z95, to set the flag G or flag C to "0" or "1". The flag G and flag C thus set are used in the above illumination processing (FIG. 27), and the controlling of the light scattering state/light non-scattering state for the display segment Z106 showing the lattice lines for composition and the display segment Z107 showing the circle line for photometry is performed in accordance with the selected state.

In the next step ZS11, the brightness (luminance of subject) of the screen Z4 provided in the vicinity of the liquid-crystal display panel Z10 is detected (photometry) on the basis of outputs of the photometric element Z9. The results of this photometry are used to calculate exposure in the subsequent step ZS12 and to judge in the above illumination processing (FIG. 27) whether or not the LED is made to emit light.

In the next step ZS12, the shutter speed and stop valve (or the number of stop-down steps from the full aperture) are determined from a film speed set by a film speed setting unit (not shown), the luminance of the subject (brightness in the vicinity of the liquid-crystal display panel Z10) detected in the above step ZS11 and a preset function of a preset exposure mode (e.g., a programmed automatic exposure mode).

In the next step ZS13, judgement is made on whether or not the release button (not shown) is full-pressed down, in accordance with the on/off of the release switch Z85. When at this point of time the release button is full-pressed down, you proceed to processing in a step ZS14 and subsequent steps. When it is not yet full-pressed down, you return to the step ZS2 without executing steps ZS14 to ZS16 and ZS25.

Where the release button has been full-pressed down (the result of judgement in the step ZS13 is "Yes") and you proceed to the step ZS14, the exposure control unit Z60 is so controlled as to provide the shutter speed and stop valve (or the number of stop-down steps from the full aperture) determined through the above step ZS12, where film phototaking (exposure of film to light) is performed. Upon end of the exposure control in this step ZS14, the feed unit Z70 is driven in a step ZS15, and the film Z11 is wound up by one frame.

In the next step ZS16, judgement is made on whether or not the film has come to an end, in accordance with outputs from the film-end detection unit Z75. While the result of judgement in this step ZS16 is kept "No", you return to the step ZS2, where the processing of photo-taking for the next frame is performed.

Meanwhile, when the film comes to an end upon wind-up of the film, you proceed to the step ZS25, where the film is rewound (the film is rewound to rewind the film into a cassette), thus the main program is completed.

As described above, in the present embodiment, when the selected indication segment (any one of the indication segments Z101 to Z105) is desired to be displayed in a state contrasting distinctively with other display segments Z106 and Z107, the lattice lines for composition (display segment Z106) and the circle line for photometry (display segment Z107) which are displayed in the light scattering state are temporarily and forcedly brought into the light non-scattering state, and then the LED Z31 of the light source Z30 is lighted. Hence, what is displayed on the liquid-crystal display panel Z10 is only the selected indication segment (the indication showing the focus area), and only this indication segment look bright on the display.

The illumination processing executed in the step ZS5 of the above main program (FIG. 26) is described below with reference to FIG. 27.

Upon start of this illumination processing, first, in a step ZS101, the brightness of the screen Z4 is detected (photometry) by means of the photometric element Z9.

In the next step ZS102, judgement is made on whether or not the luminance on the screen Z4 in the vicinity of the liquid-crystal display panel Z10 is below a preset value. When the result of this judgement is "No" (brighter than a preset luminance), the LED Z31, even if it is turned on, provides illumination which is darker than the brightness of the subject, and any effect of making the display pattern easy to see can not be expected. Accordingly, the main routine is ended without lighting the LED Z31.

When the result of judgement in the step ZS102 is "Yes" (darker than a preset luminance), the LED Z31 of the light source Z30 is turned on to make illumination light enter the liquid-crystal display panel Z10 from its edge face Z10a to perform the processing in the step ZS and subsequent steps so that the display pattern (selected indication segment) is superimposed on the dark background. Incidentally, the luminance on the screen Z4 in the vicinity of the liquid-crystal display panel Z10 in a case in which the apex system is employed can be expressed as (Bv-Av0) using Bv which represents a luminance of a subject and Av0 which represents a full-open aperture of a lens mounted. Accordingly, in determining the preset luminance, it may be set as a value between 1.0 and 4.0 (preferably a value of about 2.5).

In the next step ZS103, judgement is made on whether or not the flag G is "1". When the result of judgement in this step is "Yes", i.e., the display segment Z106 of lattice lines for composition stands selected to have come into the light scattering state, you proceed to a step ZS104, where the lattice lines for composition (display segment Z106) which is in the light scattering state is forcedly brought into the light non-scattering state (non-display), and then you proceed to a step ZS105. When on the other hand the result of judgement in the step ZS103 is "No" (when the display segment Z106 of lattice lines for composition is not selected and kept in the light non-scattering state), the step ZS104 is skipped, and you proceed to the step ZS105.

In the step ZS105, judgement is made on whether or not the flag C is "1". When the result of judgement in this step is "Yes", i.e., the display segment Z107 of circle line for photometry stands selected to have come into the light scattering state, you proceed to a step ZS107, where the circle line for photometry (display segment Z107) which is in the light scattering state is forcedly brought into the light non-scattering state (non-display), and then you proceed to a step ZS105 and subsequent steps. When on the other hand the result of judgement in the step ZS105 is "No" (when the display segment Z107 of circle line for photometry is not selected and kept in the light non-scattering state), the step ZS106 is skipped, and you proceed to a step ZS107 and subsequent steps.

In the step ZS107, the LED Z31 of the light source Z30 is turned on for only a preset time (e.g., about 300 ms).

Upon end of the lighting of the LED Z31 for a preset time, judgement is made in the next step ZS108 on whether or not the flag C is "1". When the result of judgement in this step is "Yes", i.e., the circle line for photometry (display segment Z107) has forcedly been brought into the light non-scattering state in the above step ZS108, you proceed to a step ZS109, where the circle line for photometry (display segment Z107) which is in the light non-scattering state is again brought into the light scattering state (display state), and then you proceed to a step ZS110. When on the other hand the result of judgement in the step ZS108 is "No", the step ZS109 is skipped, and you proceed to the step ZS110 and subsequent steps.

In the step ZS110, judgement is made on whether or not the flag G is "1". When the result of judgement in this step is "Yes", i.e., the lattice lines for composition (display segment Z106) have forcedly been brought into the light non-scattering state in the above step ZS104, you proceed to a step ZS111, where the lattice lines for composition (display segment Z106) which are in the light non-scattering state are again brought into the light scattering state (display state), to end the main routine. When on the other hand the result of judgement in the step ZS110 is "No", the step ZS111 is skipped to end the main routine.

As a result of this illumination processing, the focus area (any one of the indication segments Z101 to Z105) selected and displayed in the light scattering state is illuminated by the LED Z31 for a preset time. Here, even if the lattice lines for composition (display segment Z106) and the circle line for photometry (display segment Z107) are in the light scattering state, they have temporarily and forcedly been changed into the light non-scattering state as a result of the above illumination processing. Hence, these lattice lines for composition (display segment Z106) and circle line for photometry (display segment Z107) are by no means illuminated by the LED Z31.

Because of this illumination processing, only the indication segment corresponding to the indication (focus area) selected and having come into the light scattering state is illuminated when the release button (not shown) is half-pressed down and also throughout a preset period after cancellation of half-press-down, thus the photographer can easily see it.

The selected-area judgement processing executed in the step ZS6 of the main program shown in FIG. 26 is described below with reference to the flow chart of FIG. 28.

Figure 25:
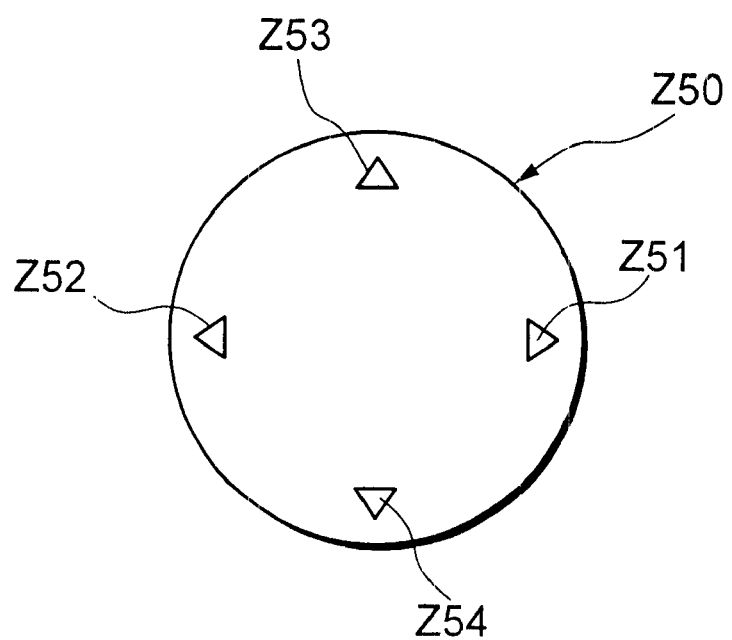
FIG. 25 illustrates a focus area selector Z50.

This selected-area judgement processing is processing for judging which focus area has been selected by photographer's operation of the focus area selector Z50 (FIG. 25). The parameter A is set to any of "0" to "4".

In this selected-area judgement processing, the parameter A at the time the switch Z51 is turned on as a result of operating the focus area selector Z50 is set in steps ZS202 to 208, the parameter A at the time the switch Z52 is turned on is set in steps ZS209 to 215, the parameter A at the time the switch Z53 is turned on is set in steps ZS216 to 222, and the parameter A at the time the switch Z54 is turned on is set in steps ZS223 to 229.

Upon start of this selected-area judgement processing, first the flag F is set to "1" in the step ZS201. This flag F, when its value is "1", shows that the parameter A has been changed in the present loop; and when "0", that no change has been made.

In the next step ZS202, judgement is made on whether or not the right has been pressed (the switch Z51 is on). When the result of judgement in this step is "Yes", judgement is made on which switch among switches Z51 to 54 had been pressed in the previous loop, in accordance with the value of the parameter A.

Then, when the right is pressed (the switch Z51 is on) in the present loop, and where its opposite side (the left-side switch Z52) had been on in the previous loop (the result of judgement in the step ZS206 is "Yes"), the parameter A is set to "0" (step ZS207) so as to show that the center (the indication segment Z101 shown in FIG. 19) has been selected as a focus area. On the other hand, where the other indication segment Z102, Z103 or Z104 had been selected (the result of judgement in any of the steps ZS203 to Zs205 is "Yes") in the previous loop, the parameter A is set to "1" (step ZS208) so as to show that the indication segment Z102, Z103 or Z104 is changed to the indication segment Z105 in the present loop.

When the indication segment Z105 is already selected in the previous loop, the results of judgement in all the steps ZS203 to ZS206 turn to "No", and the main routine is ended without changing the parameter A (here, the parameter A is "1").

In the same way, the parameter A at the time the switch Z52 is turned on is set (=2) in steps ZS209 to 215, the parameter A at the time the switch Z53 is turned on is set (=3) in steps ZS216 to 222, and the parameter A at the time the switch Z54 is turned on is set (=4) in steps ZS223 to 229.

When it is judged in the present loop that none of the switches Z51 to Z54 are on, the flag F is set to "0" in the step ZS230 so as to show that any area is changed.

Thus, the parameter A which shows the position of a selected focus area (any of the indication segments Z101 to Z105) is used in liquid-crystal drive control (not shown), and the selected indication segment is brought into the light scattering state and the other indication segments are so controlled as to be in the light non-scattering state.

Figure 29:
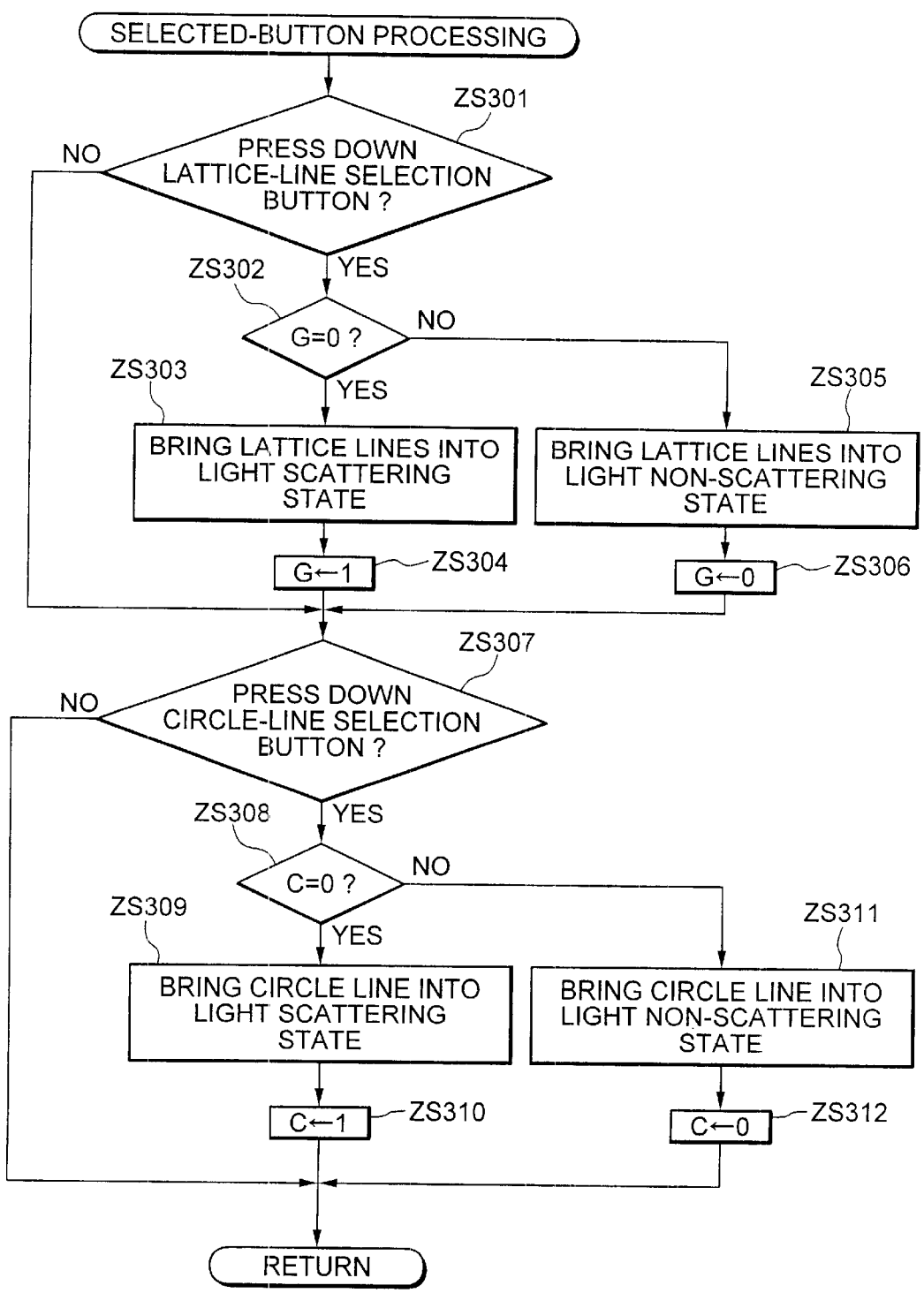
FIG. 29 is a flow chart showing selected-button processing executed in the main program.

The selected-button processing executed in the step ZS10 of the main program shown in FIG. 26 is described below with reference to the flow chart of FIG. 29.

This selected-button processing is processing for bringing the lattice lines for composition (display segment Z106) and circle line for photometry (display segment Z107) into the light scattering state or light non-scattering state according to the state of operating the lattice-line selection switch Z90 and circle-line selection switch Z95.

Upon start of this program, first in a step ZS301, judgement is made on whether or not the photographer has pressed down a lattice-line selection button (not shown) in accordance with the on/off of the lattice-line selection switch Z90.

When the result of judgement in the step ZS301 is "No", steps ZS302 to ZS306 are skipped, and you proceed to a step ZS307 and subsequent steps.

When the result of judgement in this step ZS301 is "Yes" (when the button is pressed down), you proceed to the step ZS302, where judgement is made, in accordance with the value of the flag G, on whether or not the lattice lines for composition (display segment Z106) has already come into the light scattering state in the previous loop.

When the lattice lines for composition (display segment Z106) are in the light non-scattering state in the previous loop (the flag G is "0"), the result of judgement in the step ZS302 turns to "Yes", and in a step ZS303 the lattice lines for composition (display segment Z106) are changed into the light scattering state, where the flag G is set to "1" (step ZS304) so as to show it to that effect, then you proceed to the step ZS307 and subsequent steps.

When on the other hand the lattice lines for composition (display segment Z106) are in the light scattering state in the previous loop (the flag G is "1"), the result of judgement in the step ZS302 turns to "No", and in a step ZS305 the lattice lines for composition (display segment Z106) are changed into the light non-scattering state, where the flag G is set to "0" (step ZS306) so as to show it to that effect, then you proceed to the step ZS307 and subsequent steps.

In the step ZS307, this time, judgement is made on whether or not the photographer has pressed down a circle-line selection button (not shown), in accordance with the on/off of the circle-line selection switch Z95.

When the result of judgement in the step ZS307 is "No", the main program is ended as it is.

When the result of judgement in this step ZS307 is "Yes" (when the button is pressed down), you proceed to the step ZS308, where judgement is made, in accordance with the value of the flag C, on whether or not the circle line for photometry (display segment Z107) has already come into the light scattering state in the previous loop.

When the circle line for photometry (display segment Z107) is in the light non-scattering state in the previous loop (the flag C is "0"), the result of judgement in the step ZS308 turns to "Yes", and in a step ZS309 the circle line for photometry (display segment Z107) is changed into the light scattering state, where the flag C is set to "1" (step ZS310) so as to show it to that effect, then the main program is ended.

When on the other hand the circle line for photometry (display segment Z107) is in the light scattering state in the previous loop (the flag C is "1"), the result of judgement in the step ZS308 turns to "No", and in a step ZS311 the circle line for photometry (display segment Z107) is changed into the light non-scattering state, where the flag C is set to "0" (step ZS312) so as to show it to that effect, then the main program is ended.

As described above in detail, according to the liquid-crystal display device (comprising the liquid-crystal display panel Z10, the holder Z20, the light source Z30, the guide path (light guide means) Z40, the focus area selector Z50, the drive circuit Z7, and the CPU Z8) used in the single-lens reflex camera Z1 according to the first embodiment, the indication segment (any of the indication segments Z101 to Z105) used in autofocusing is brought into the light scattering state when the image reflected in the view finder's screen Z4 provided with the liquid-crystal display panel Z10 is an optically bright image such as an outdoor scene. Hence, the indication segment thus brought into the light scattering state looks dark and can easily be seen. When on the other hand the image reflected in the view finder's screen Z4 is dark, the illumination light is applied from the light source Z30 to the indication segment (any of the segments Z101 to Z105) which is in the light scattering state, so that the indication segment (any of the segments Z101 to Z105) look bright and can easily be seen.

In this case, illumination light with a specific color (e.g., red) may be applied from the light source Z30, where the selected indication segment (any of the segments Z101 to Z105) is displayed in the same specific color, and the indication segment can more easily be seen.

When the indication segment (any of the segments Z101 to Z105) is illuminated by the illumination light from the light source Z30, the display segment Z106 showing lattice lines for composition and the display segment 107 showing circle line for photometry are forcedly so controlled as to be in the light non-scattering state during illumination by the light source Z30 even if they are in the light scattering state. Hence, in the view finder of the single-lens reflex camera Z1, only the selected indication segment (any of the segments Z101 to Z105) is illuminated by light and can easily be seen in a state contrasting distinctively with other display segments. As the result, the photographer can clearly see the selected focus area (indication) at a glance, bringing about a great improvement in the operability of the device.

After the illumination by the light source Z30 over a stated time, the display segments Z106 and Z107 forcedly changed from the light scattering state into the light non-scattering state are again returned to the light scattering state. Hence, the photographer by no means has any sense of incongruity even when the selected indication segment (any of the segments Z101 to Z105) is returned to the original state instantaneously after it has been displayed in a state contrasting distinctively.

The embodiment described above is described giving an example in which the luminance (luminance of a subject) of the screen Z4 provided in the vicinity of the liquid-crystal display panel Z10 is detected by the photometric element Z9 and the light source Z30 is turned on only when the luminance is below a preset luminance. However, the light source Z30 may be turned on without regard to the luminance of a subject. In such a case, when the luminance of a subject is sufficiently high as in the case of photo-taking in broad daylight (when the image formed on the screenZ4 is bright), the illumination light is darker than the luminance of a subject. Hence, the selected indication segment (any of the segments Z101 to Z105) is superimposed as a dark display pattern on a bright background.

A second embodiment of the third invention will be described below with reference to FIGS. 30 and 31.

This second embodiment differs from the above first embodiment in that only the display segment Z106 showing lattice lines for composition is on/off controlled as a display segment different from the indication segments Z101 to Z105.

Hence, in the second embodiment of the third invention, the display segment 107 showing circle line for photometry, formed in the liquid-crystal display panel Z10, is not formed in the display segments, and the circle-line selection switch for making it on/off is also not provided. Incidentally, the other factors, the hardware such as the construction of the liquid-crystal display panel Z10, the construction of the liquid-crystal display device and the construction of the single-lens reflex camera Z1, and the software such as the main program (FIG. 26) for performing the whole action control of the single-lens reflex camera Z1, the selected-area processing (FIG. 28) executed in the step ZS6 of the main program, and so forth are the same as those in the first embodiment of the third invention. Accordingly, their detailed description i omitted.

Figure 30:
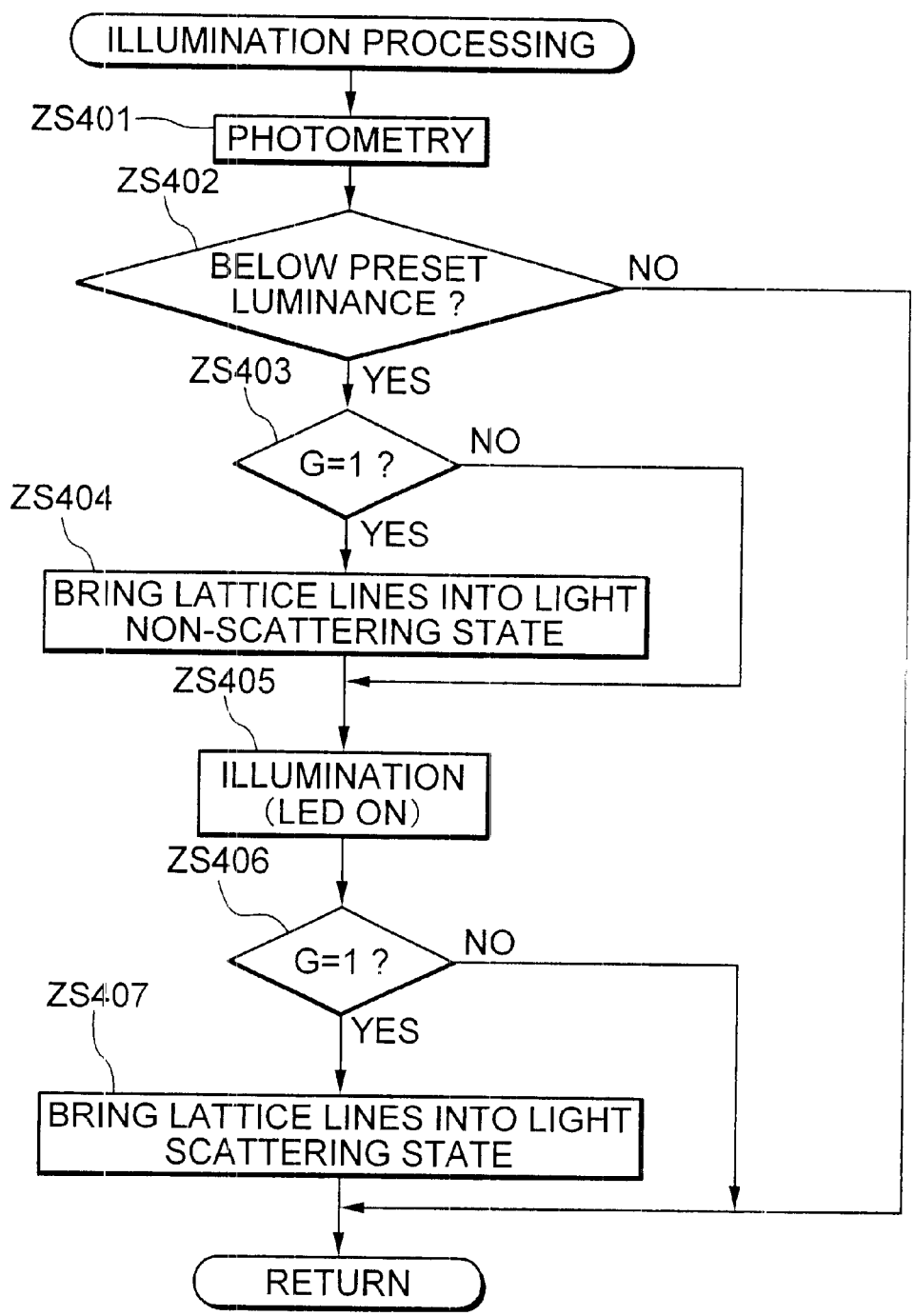
FIG. 30 is a flow chart showing illumination processing executed in the main program according to a second embodiment of the third invention.
Figure 31:
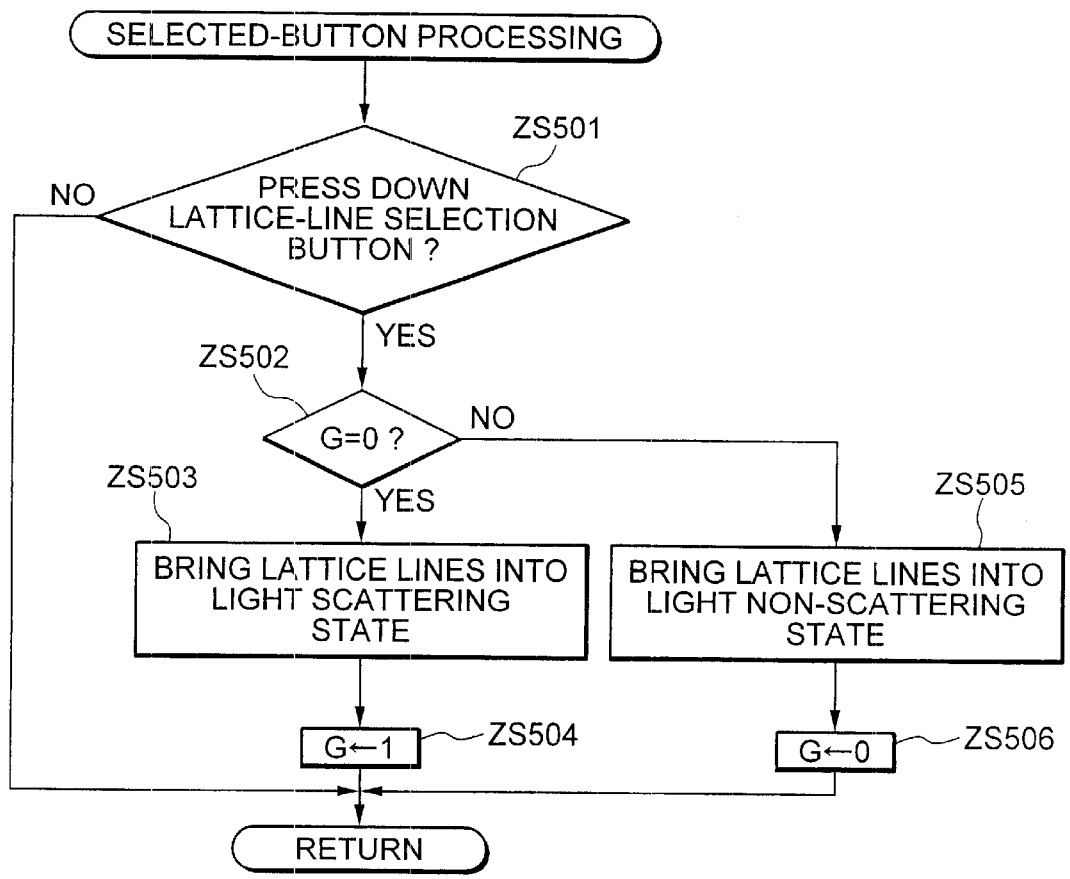
FIG. 31 is a flow chart showing selected-button processing executed in the main program according to the second embodiment of the third invention.

FIG. 30 is a flow chart showing illumination processing executed in the main program according to a second embodiment of the third invention.

Upon start of this illumination processing, first, in a step ZS401, the brightness of the screen Z4 is detected (photometry) by means of the photometric element Z9. Then, in a step ZS402, judgement is made on whether or not the luminance on the screen Z4 in the vicinity of the liquid-crystal display panel Z10 is below a preset value. When the result of this judgement is "No", the main routine is ended without lighting the LED Z31. Here, the present value of the luminance is the same value as that used in the first embodiment.

When the result of judgement in the step ZS402 is "Yes", judgement is made in a step ZS403 on whether or not the flag G is "1". When the result of judgement in this step is "Yes", the display segment Z106 of the lattice lines for composition is in the light scattering state, and hence in a step ZS404 this is forcedly brought into the light non-scattering state (non-display), then you proceed to a step ZS405. When on the other hand the result of judgement in the step ZS403 is "No", you proceed to a step ZS405.

In the step ZS405, the LED Z31 of the light source Z30 is turned on only for a preset time (e.g., about 300 ms).

Upon end of the lighting of the LED for a preset time, judgement is made in the next step ZS407 on whether or not the flag G is "1". When the result of judgement in this step is "Yes", i.e., the lattice lines for composition (display segment Z106) have forcedly been brought into the light non-scattering state in the above step ZS404, you proceed to the step ZS407, where the lattice lines for composition (display segment Z106) which are in the light non-scattering state are again brought into the light scattering state (display state) to end the main routine. When on the other hand the result of judgement in the step ZS404 is "No", the step ZS407 is skipped to end the main routine.

As a result of this illumination processing, the focus area (any one of the indication segments Z101 to Z105) selected and displayed in the light scattering state is illuminated by the LED Z31 for a preset time. Here, even if the lattice lines for composition (display segment Z106) are in the light scattering state, they have temporarily and forcedly been changed into the light non-scattering state as a result of the above illumination processing. Hence, the lattice lines for composition (display segment Z106) are by no means illuminated by the LED Z31.

The selected-button processing executed in the main program (FIG. 26) is described below with reference to the flow chart of FIG. 31.

This selected-button processing is processing for bringing the lattice lines for composition (display segment Z106) into the light scattering state or light non-scattering state according to the state of operating the lattice-line selection switch Z90.

Upon start of this program, first in a step ZS501, judgement is made on whether or not the photographer has pressed down a lattice-line selection button (not shown). When the result of judgement in the step ZS501 is "No", steps ZS502 to ZS506 are skipped to end the main program.

When the result of judgement in this step ZS501 is "Yes", you proceed to the step ZS502, where judgement is made, in accordance with the value of the flag G, on whether or not the lattice lines for composition (display segment Z106) have already come into the light scattering state in the previous loop.

When the lattice lines for composition are in the light non-scattering state in the previous loop, the result of judgement in the step ZS502 turns to "Yes", and in a step ZS503 the lattice lines for composition are changed into the light scattering state, where the flag G is set to "1" (step ZS504) to end the main program.

When on the other hand the lattice lines for composition are in the light scattering state in the previous loop (the result of judgement in the step ZS302 is "No"), in a step ZS505 the lattice lines for composition are changed into the light non-scattering state, where the flag G is set to "0" (step ZS506) to end the main program.

In the second embodiment of the third invention as described above, when the selected indication segment (any of the segments Z101 to Z105) is illuminated by the illumination light from the light source Z30, the display segment Z106 showing lattice lines for composition is temporarily and forcedly so controlled as to be in the light non-scattering state even if it is in the light scattering state (display state). Hence, only the selected indication segment (any of the segments Z101 to Z105) can clearly be displayed.

As described above, according to the liquid-crystal display device of the third invention, the indication segment selected by selection operation and the display segment different from that indication segment are independently controlled so as to be in the light scattering state or the light non-scattering state. When so controlled, in the state of action which requires to make sure of the selected indication, the display segment kept in the light scattering state is so controlled as to be in the light non-scattering state, and then the light source is made to emit light. Hence, the selected indication segment can be displayed in a state contrasting distinctively with other different display segments, bringing about a great improvement in the operability of the electronic optical instrument.

According to the liquid-crystal display device of the third invention in its preferred aspect, the light from the light source is emitted for a preset period and thereafter the display segment having forcedly been changed into the light non-scattering state is returned into the light scattering state. Hence, the selected indication segment can be displayed in a state contrasting distinctively for the preset period so that the photographer can clearly see the indication segment and thereafter the photographer can see the other display segments. Here, as to the other display segments again returned to the light scattering state, the photographer by no means has any sense of incongruity since they are returned to the original state instantaneously.

According to the liquid-crystal display device of the third invention in its other preferred aspect, the control means prohibits the light source from emitting light when the luminance in the vicinity of the liquid-crystal display panel, measured by the photometric means, is not lower than a preset value. Hence, when the surrounding of the liquid-crystal display panel is dark, the selected indication segment is illuminated by the light from the light source to become easy to see. When the surrounding of the liquid-crystal display panel is bright, the selected indication segment look dark in the light scattering state to become easy to see, bringing about an improvement in the operability of the electronic optical instrument.

According to the liquid-crystal display device of the third invention in its still other preferred aspect, autofocus cameras can be provided with the liquid-crystal display device described above. Hence, in at least one of the state of autofocusing motion and the state of focus area selection, it can easily be performed at a glance to make sure of the indication segment showing a focus area and to select the focus area while making sure of the selected focus area, bringing about an improvement in the operability.

Figure 32:
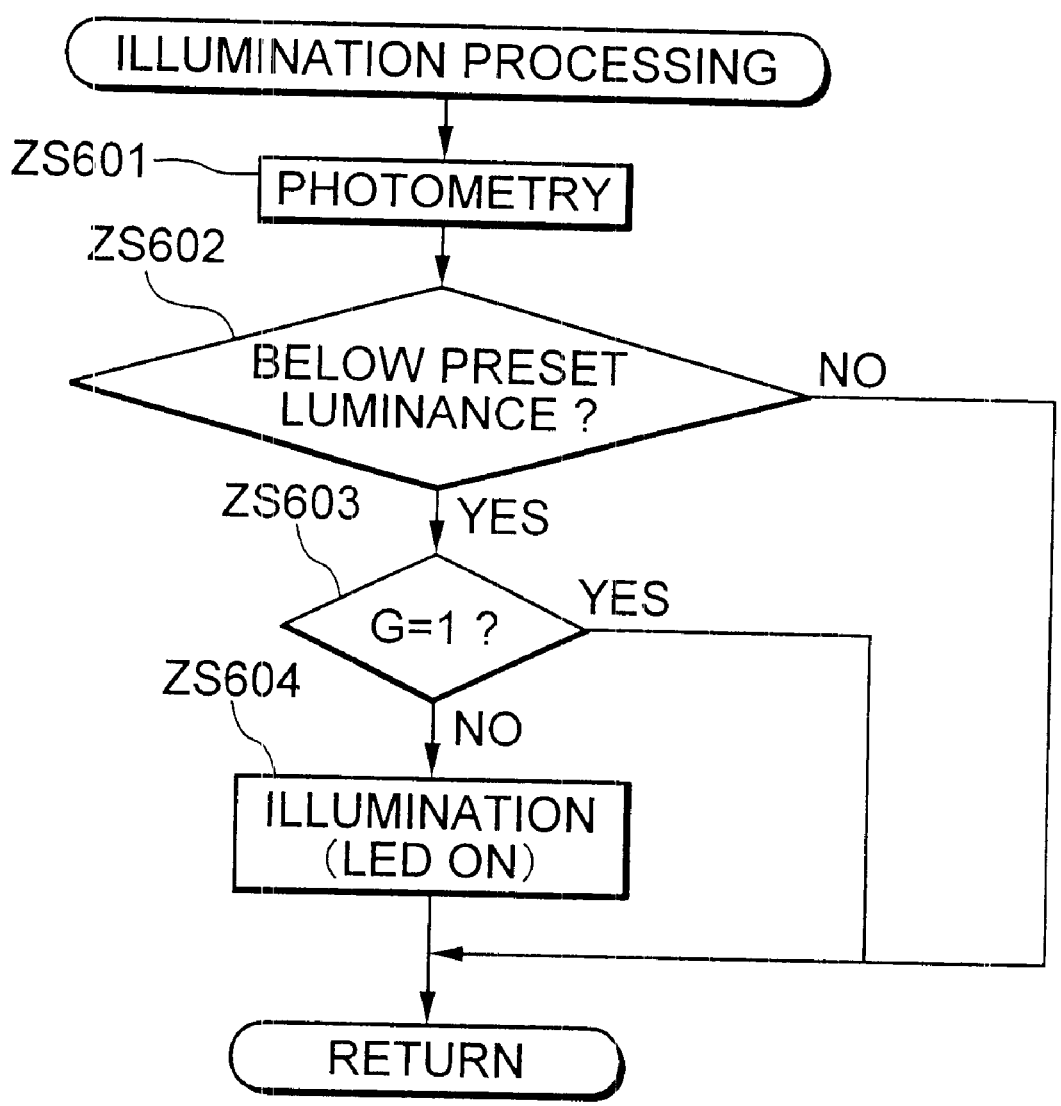
FIG. 32 is a flow chart showing another illumination processing executed in a further embodiment of the third invention.

With reference to FIG. 32, a further embodiment of the third invention, in which a selected focus area is illuminated, will be described.

Upon start of this illumination processing in a step ZS601, the brightness of the screen Z4, that is, the brightness of an object to be phototaken is detected (photometry) by means of the photometric element Z9.

In the next step ZS602, judgement is made on whether or not the luminance on the screen Z4 in the vicinity of the liquid-crystal display panel Z10 is below a preset value. When the result of this judgement is "No" (brighter than a preset luminance), no illumination is made, and the main routine is ended without lighting the LED Z31.

When the result of judgement in the step ZS602 is "Yes" (darker than a preset luminance), the flow advances to the next step ZS603.

In the next step ZS603, judgement is made on whether or not the flag G is "1". When the result of judgement in this step is "Yes", i.e., the display segment Z106 of lattice lines for composition stands selected to have come into the light scattering state, no illumination is made. When on the other hand the result of judgement in the step ZS603 is "No" (when the display segment Z106 of lattice lines for composition is not selected and kept in the light non-scattering state), the flow advances to the step ZS604, and the LED Z31 of the light source Z30 is turned on to make illumination onto the focus area.

In the last described embodiment, when the lattice lines for composition are displayed no illumination onto the focus area is conducted, while only when no lattice lines for composition are displayed, the focus area is illuminated by the LED.

What is claimed is:

1. A liquid-crystal display device comprising a polymer-dispersed liquid-crystal layer capable of coming into a light scattering state when no voltage is applied, and first and second transparent electrodes capable of forming an electric field in the polymer-dispersed liquid-crystal layer;

said first transparent electrode having a first electrode pattern and a second electrode pattern disposed adjoiningly to the first electrode pattern via a boundary area between them;

said boundary area having a width adequate to make transparent the polymer-dispersed liquid-crystal layer at its area corresponding to the boundary area, by the action of an electric field formed by said second electrode pattern and second transparent electrode.

2. The liquid-crystal display device according to claim 1, wherein said first electrode pattern is a display pattern, said second electrode pattern is a background pattern, and said boundary area has a width substantially equal to the layer thickness of said polymer-dispersed liquid crystal layer.

3. The liquid-crystal display device according to claim 1, wherein said first electrode pattern is a wiring pattern, said second electrode pattern is a background pattern, and said first electrode pattern and boundary area have a total width substantially equal to the layer thickness of said polymer-dispersed liquid crystal layer.

4. The liquid-crystal display device according to claim 3, wherein said first electrode pattern is a pattern extending in a line, and said boundary area is positioned along said first electrode pattern on each side thereof.

5. The liquid-crystal display device according to claim 4, wherein said total width is substantially equal to the layer thickness of said polymer-dispersed liquid crystal layer.

6. A camera comprising the liquid-crystal display device according to claim 1, and a control circuit for driving and controlling the liquid-crystal display device.

* * * * *